(12) United States Patent
Gordon et al.

(10) Patent No.: US 8,688,780 B2
(45) Date of Patent: Apr. 1, 2014

(54) PEER-TO-PEER EXCHANGE OF DATA RESOURCES IN A CONTROL SYSTEM

(75) Inventors: Kevin G. Gordon, Annacis Island Delta (CA); Michael D. Kalan, Highland Heights, OH (US); Taryl J. Jasper, South Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 438 days.

(21) Appl. No.: 12/695,869

(22) Filed: Jan. 28, 2010

(65) Prior Publication Data

US 2010/0153771 A1   Jun. 17, 2010

Related U.S. Application Data

(63) Continuation-in-part of application No. 11/239,823, filed on Sep. 30, 2005, now abandoned.

(51) Int. Cl.
  *G06F 15/16* (2006.01)
  *G06F 15/173* (2006.01)

(52) U.S. Cl.
  USPC .......................................... 709/204; 709/224

(58) Field of Classification Search
  USPC .......................................... 709/203, 204, 224
  See application file for complete search history.

(56) References Cited

U.S. PATENT DOCUMENTS

| | | | |
|---|---|---|---|
| 4,489,379 A | 12/1984 | Lanier et al. | |
| 4,539,677 A | 9/1985 | Lo | |
| 5,539,660 A | 7/1996 | Blair et al. | |
| 5,615,330 A | 3/1997 | Taylor | |
| 5,873,103 A | 2/1999 | Trede et al. | |
| 6,282,610 B1 | 8/2001 | Bergsten | |
| 6,411,987 B1 * | 6/2002 | Steger et al. | 709/203 |
| 6,430,611 B1 | 8/2002 | Kita et al. | |
| 6,530,036 B1 | 3/2003 | Frey, Jr. | |
| 6,768,999 B2 | 7/2004 | Prager et al. | |
| 6,782,085 B1 | 8/2004 | Becker et al. | |
| 6,938,042 B2 | 8/2005 | Aboulhosn et al. | |
| 7,047,358 B2 | 5/2006 | Lee et al. | |
| 7,246,140 B2 | 7/2007 | Therrien et al. | |
| 7,266,556 B1 | 9/2007 | Coates | |

(Continued)

OTHER PUBLICATIONS

Bram Cohen, "Incentives Build Robustness in BitTorrent", May 22, 2003, pp. 1-5.*

(Continued)

*Primary Examiner* — Hee Soo Kim
(74) *Attorney, Agent, or Firm* — Amin, Turocy & Watson, LLP

(57) ABSTRACT

System(s) and method(s) are provided for peer-to-peer exchange of data in a control system. Decentralized storage and multi-access paths provide complete sets of data without dependence on a specific or pre-defined data source or access paths. Data is characterized as data resources with disparate granularity. The control system includes a plurality of layers that act as logic units communicatively coupled through access network(s). Server(s) resides in a service layer, whereas client(s) associated with respective visualization terminal(s) are part of a visualization layer. Peer-to-peer distribution of data resource(s) can be based on available access network(s) resources and optimization of response time(s) in the control system. When client requests a data resource, all the locations of the data resource and the quickest source to retrieve it are automatically determined. The client stores copy of data resource. Peer-to-peer distribution of data resource(s) can be implemented within the service layer or the visualization layer.

29 Claims, 22 Drawing Sheets

(56) References Cited

U.S. PATENT DOCUMENTS

| | | | |
|---|---|---|---|
| 8,280,948 B1* | 10/2012 | Chen | 709/203 |
| 2003/0187853 A1 | 10/2003 | Hensley et al. | |
| 2003/0191753 A1 | 10/2003 | Hoch | |
| 2004/0117549 A1 | 6/2004 | Nakamura | |
| 2004/0123027 A1 | 6/2004 | Workman et al. | |
| 2004/0139222 A1* | 7/2004 | Slik et al. | 709/236 |
| 2005/0091289 A1* | 4/2005 | Shappell et al. | 707/201 |
| 2005/0108368 A1* | 5/2005 | Mohan et al. | 709/220 |
| 2005/0131871 A1* | 6/2005 | Howard et al. | 707/3 |
| 2005/0165752 A1 | 7/2005 | Mathew et al. | |
| 2005/0187977 A1 | 8/2005 | Frost | |
| 2005/0216523 A1 | 9/2005 | Sakaguchi et al. | |
| 2005/0246393 A1* | 11/2005 | Coates et al. | 707/200 |
| 2006/0015546 A1 | 1/2006 | Sawadsky et al. | |
| 2006/0031386 A1 | 2/2006 | Burbeck | |
| 2006/0230076 A1 | 10/2006 | Gounares et al. | |
| 2006/0271530 A1 | 11/2006 | Bauer | |

OTHER PUBLICATIONS

Gil Utard, "Data Durability in Peer to Peer Storage Systems", 2004, Sections 1-6.*

Bram Cohen, Incentives Build Robustness in BitTorrent, May 22, 2003, www.bittorrent.org.

* cited by examiner

PEER-TO-PEER EXCHANGE OF DATA RESOURCES IN A CONTROL SYSTEM

CROSS-REFERENCE TO RELATED APPLICATION

The subject application is a continuation-in-part of U.S. patent application Ser. No. 11/239,823, entitled "ROBUST DATA AVAILABILITY SYSTEM HAVING DECENTRALIZED STORAGE AND MULTIPLE ACCESS PATHS," and filed on Sep. 30, 2005. The entirety of this application is incorporated herein by reference.

TECHNICAL STATEMENT

The subject disclosure relates to data storage and distribution, and more specifically, to peer-to-peer distribution of data within an integrated industrial control system.

BACKGROUND

With advances in computing, such systems are employed in many aspects of communications, industrial control, and industry, in general. As manufacturing becomes more complex and specialized, computing systems and the data and software programs utilized to monitor and control these processes are essential. Downtime related to hardware and/or software failure becomes crucial in terms of cost, lost productivity, and output.

Manufacturing control and monitoring systems consist of and produce enormous amounts of data. This includes configuration data such as controller code, and alarm, HMI (human-machine interface) data, recipe and report definitions, to name just a few. Additionally, while running, control systems produce both real-time and historical data about the status of a given process including alarms, process values, and audit/error logs. For example, process control workstation displays can show the current state of process variables to an operator. Additionally, historical trend objects can display historical data from a persistent store such as a database or log file. For example, trend object users can "pan" backwards in time in a line graph plotting some process variable against time to instances of the process variable that were captured (and stored) at some point in history. (e.g., "last week").

In typical distributed HMI systems the data is stored in a predefined location(s). HMI displays themselves—typically in the form of process overviews or machine detail displays—can show real-time (or last known) values to an operator. Multiple screens are created so that the operator can switch between them to view aspects of the system under control. Thus, these monitor and control screens that link to inputs and outputs for monitor and control of processes are important. Additionally, the data provided by such screens needs to be stored for later retrieval.

Typically, users are responsible for backing up and deploying the data files. Each client must have a network path to the data, and the server serving the data must be available and functioning. If the server is on a low-bandwidth path to a client or a set of clients, performance will suffer. Moreover, when the server is the central storage location, multiple remote system failures can burden the server during file and/or software retrieval, especially for large production control files and software. Thus, alternative mechanism for the safeguard and retrieval of such data is imperative for continued operation of such key systems.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation is architecture that provides high availability (quick, robust, redundant) data to users by the use of peer-to-peer technology, where the decentralized storage and multi-access paths provide the complete data set without dependence on a specific or pre-defined data source or access paths, including sourcing data from other users of the data applying large file transfer techniques of file sharing.

By using peer-to-peer technology to distribute files or other data resources, a number of benefits are realized in a distributed HMI (human-machine interface) system. Files or other data resources are distributed for storage on many computers eliminating a single point of failure. Additionally, client call-up times of requested data are reduced as the peer-to-peer technology retrieves the data from the quickest source. Since the files or other data resources can be stored in many different locations, data transfer bottlenecks that can occur on a network (e.g., LAN, WAN, WLAN, . . . ) can be eliminated. Moreover, large files or other substantive data resources can be retrieved from multiple sources at the same time eliminating the single source bottleneck.

The invention disclosed and claimed herein, in one aspect thereof, comprises a system that facilitates data management. The system includes a storage component that decentralizes data storage by storing data on a plurality of computing devices, and an access component that facilitates peer-to-peer access of the data from any one or more of the computing devices.

In another aspect of the subject invention, when a client requests a file or other data resource the system automatically calculates all the locations of that file or other data resource, and which is the quickest source to retrieve the file. The client then stores a copy of the file for instant retrieval later and to serve that file out to other clients that request it. A versioning scheme ensures that the only the newest version of files are shared on the network.

In yet another aspect thereof, a machine learning and reasoning (LR) component is provided that employs a probabilistic and/or statistical-based analysis to prognose or infer an action that a user desires to be automatically performed.

In the subject disclosure, peer-to-peer distribution is also applied to various control data and graphic data. The data is characterized as data resources with disparate granularity; the data resources comprise files; control screens; control projects; data structures, such as graphic data objects and control data objects; state information; or the like. The control system can be an industrial control system or automation control system, which typically includes control environment(s) comprising a set of one or more industrial controllers or automation controllers, a plant, a set of tools or machines, equipment, a group of sub-systems, industrial processes carried out by one or more apparatuses, or the like. In addition, the control system includes a plurality of layers that act as logic units communicatively coupled through access network(s). Server(s) resides in a service layer, whereas client(s) associated with respective visualization terminal(s) are part of a visualization layer. Peer-to-peer distribution of data resource(s) can be based on available access network(s) resources and optimization of response time(s) in the control system. In addition, peer-to-peer distribution of data resource(s) can be implemented within the service layer or the visualization layer.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
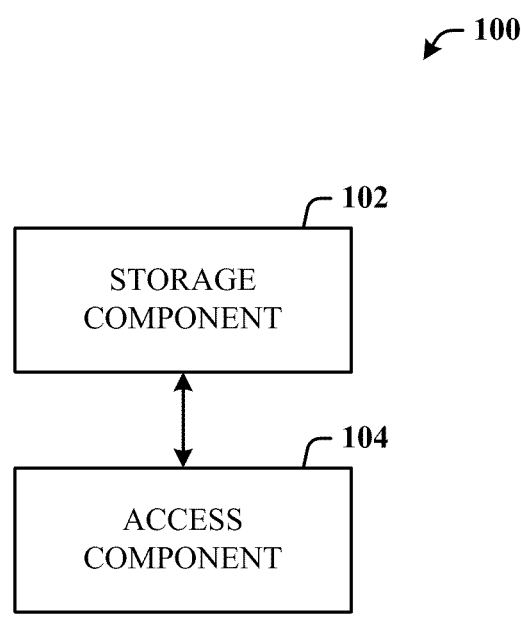
FIG. 1 illustrates a system that facilitates data management in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Referring initially to the drawings, FIG. 1 illustrates a system 100 that facilitates data management in accordance with an innovative aspect. The system 100 provides high availability (e.g., quick, robust, redundant, . . . ) data to a user by utilizing peer-to-peer technology, where the decentralized storage and multi-access paths provide a complete dataset without dependence on a specific or pre-defined data source or access paths. This includes sourcing data from one or more other users of the data by applying larger file transfer techniques and file sharing. Note that when referring to data, it is to be understood that this includes all forms and types of data and associated data formats such as in the form of a file, a document, a screen, a message, graphics, and multimedia information, for example.

By using peer-to-peer technology to distribute files, a number of benefits are realized in a distributed HMI (human-machine interface) system. Files are distributed for storage on many computers eliminating a single point of failure. Additionally, client call-up times of requested data are reduced as the peer-to-peer technology retrieves the data from the quickest source. Since the files can be are stored in many different locations, data transfer bottlenecks that can occur on a network (e.g., LAN, WAN, WLAN, . . . ) can be eliminated. Moreover, large files can be retrieved from multiple sources at the same time eliminating the single source bottleneck.

In one implementation, when a client requests a file, the system automatically calculates all storage locations of that file, and which is a quickest communications path to the source for retrieval the data and/or file. Once received, the client then stores a copy of the file for substantially instant service of that file to other requesting clients. A version scheme ensures that the only the latest version of file is shared on the network.

Accordingly, the system 100 includes a storage component 102 that decentralizes data storage by storing data on a plurality of computing devices. An access component 104 is provided that facilitates peer-to-peer access to the data via any one or more of the computing devices on which the data is stored. The system 100 can be implemented in the form of a software client that resides on computing systems available on the network.

The system 100 finds particular applicability to HMI systems where workstations are utilized to monitor and control process control systems and assembly line systems, for example. Continued reliable operation of these systems is important with regard to product reliability, product quality, product output, and a host of other cost and quality related aspects, to name just a few. These systems typically employ large files that are used to monitor and control various parameters, and so on. An operator sitting in front of a workstation overseeing a process (e.g., microelectronics device fabrication) can use many programs and graphical interface screens, etc., that are provided to view and monitor process operations. Conventionally, these files and/or data are stored on server. The subject invention distributes these files and/or data, process control screens, etc., to other computers for storage and access in case this workstation failed, or the files and/or data became corrupted.

For example, monitor and control screens that are used or accessed the most can be distributed more times than screens that are accessed fewer times. The more frequently accessed data and/or files can be stored (or backed up) on more reliable remote access nodes. Other criteria that can be considered include the speed at which data and/or file retrieval occurs from a given node and the pathways employed to retrieve the data/files.

Figure 2:
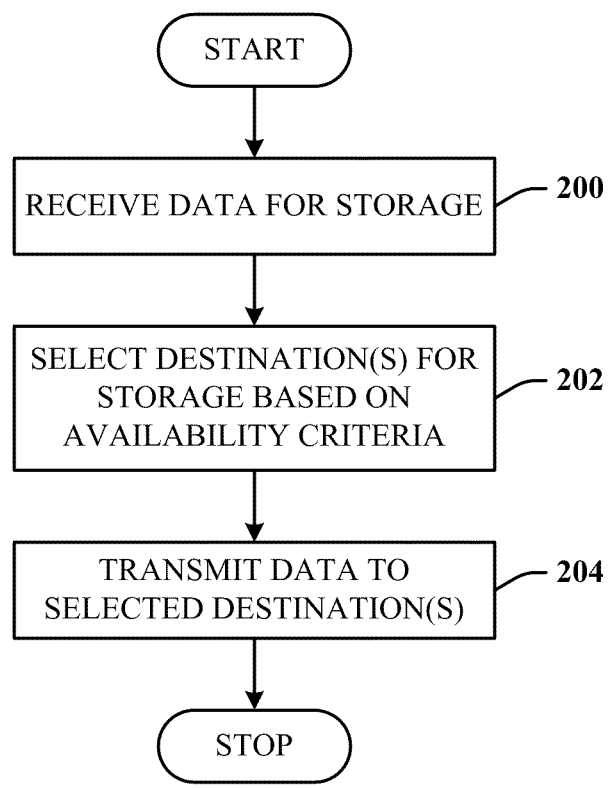
FIG. 2 illustrates a methodology of transferring data during data management in accordance with an aspect.

FIG. 2 illustrates a methodology of transferring data during data management in accordance with an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein. At 200, data is received for storage (or backup). At 202, one or more destinations are selected for storing the data, based on availability criteria. At 204, the data is transmitted to the selected destination(s) and stored.

Figure 3:
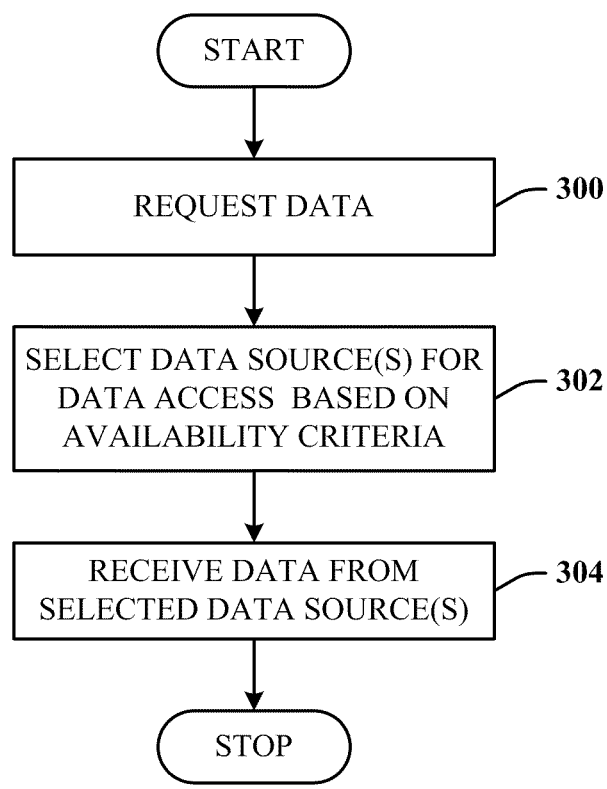
FIG. 3 illustrates a methodology of retrieving data during data management in accordance with an aspect.

FIG. 3 illustrates a methodology of retrieving data during data management in accordance with an aspect. At 300, data is requested for retrieval. At 302, one or more data sources are selected for the retrieval process based on availability criteria. At 304, the data is retrieved from the selected data source(s).

Figure 4:
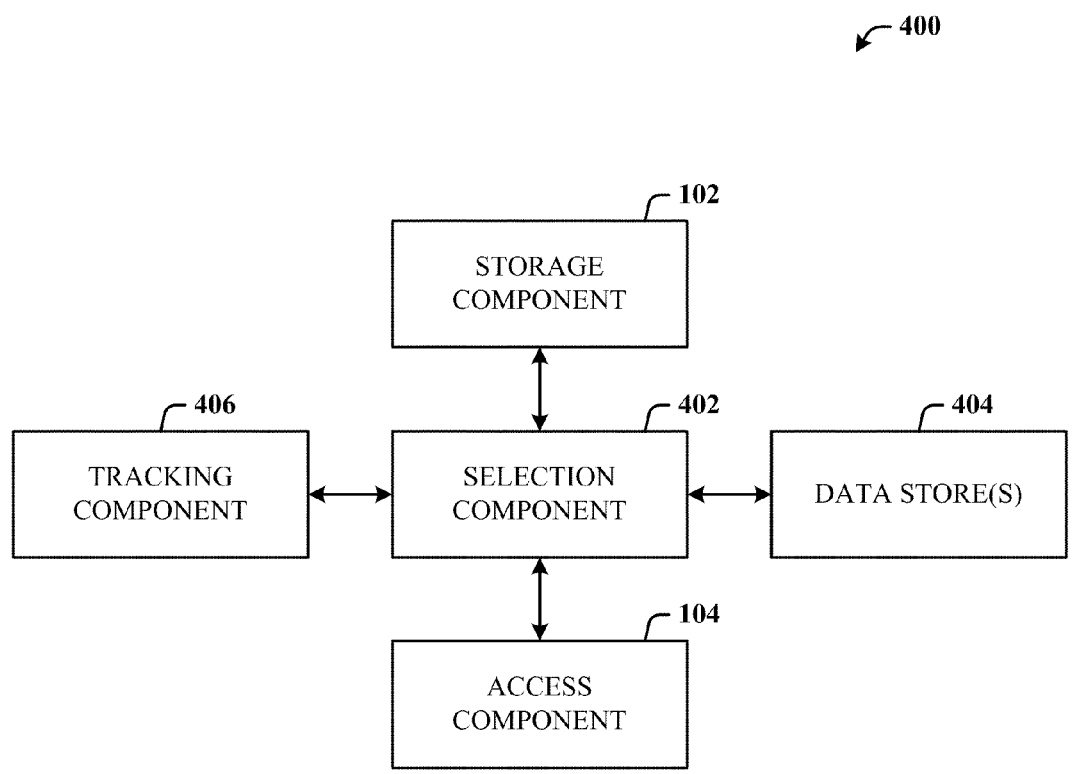
FIG. 4 illustrates a more detailed schematic block diagram of a system that facilitates data management in accordance with another aspect of the subject innovation.

FIG. 4 illustrates a more detailed schematic block diagram of a system 400 that facilitates data management in accordance with another aspect of the subject innovation. The system 400 includes the storage component 102 and access component 104 of FIG. 1. Additionally, a selection component 402 is provided that interfaces to both the storage and access components (102 and 104) to provide selection capability for the most appropriate data stores 404 of the system 400. The selection component 402 operates based at least in part on the availability criteria such as the computing systems that are available to provide the requested data, the quickest (or highest bandwidth) path from the requesting computing device to the data source, and so on. It may be that a source computing system is online, yet cannot deliver the requested data since it is currently occupied by a high priority monitor and control process operation.

The system 400 also includes a tracking component 406 that tracks activities of the system 400. These activities can include both user and system activities. When a data distribution (or storage) process is to commence, or a data retrieval process is initiated, the selection component 402 accesses the tracking component 406 to analyze tracking data as to the data and/or files that are to be processed for storage and retrieval, the nodes that are available, and the best destination/source node to utilize, for example.

Figure 5:
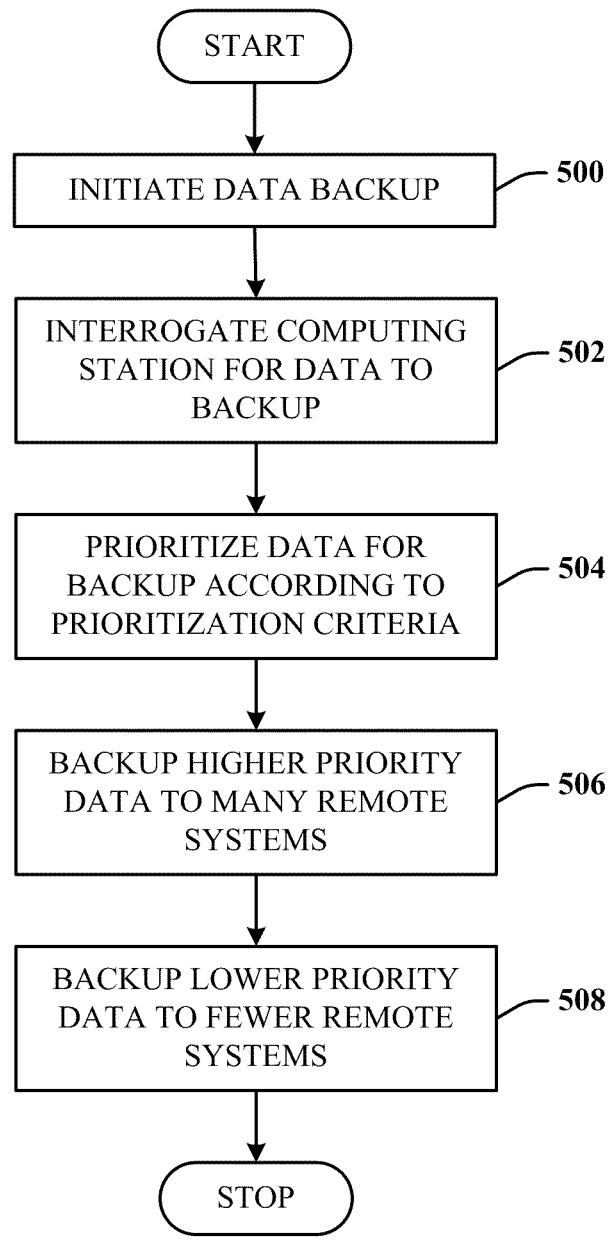
FIG. 5 illustrates a methodology of prioritizing data for backup according to an aspect.

FIG. 5 illustrates a methodology of prioritizing data for backup according to an aspect. At 500, a backup process is initiated. At 502, an interrogation process is conducted on the computing system for data and/or files to backup. At 504, the data and/or files found are prioritized according to prioritization criteria. At 506, higher priority data is stored on many remote nodes. At 508, lower priority data and/or files are backed up on a fewer number of nodes.

Figure 6:
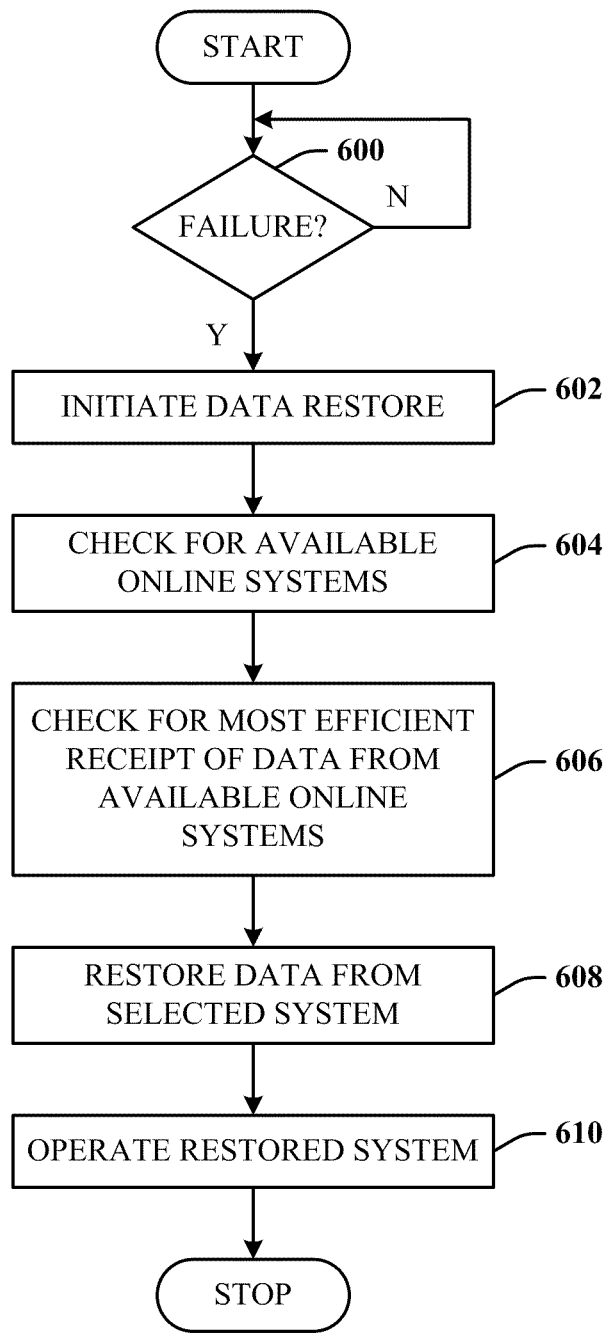
FIG. 6 illustrates a methodology of monitoring a system for failure and restoring data in accordance with the disclosed innovation.

Referring now to FIG. 6, there is illustrated a methodology of monitoring a system for failure and restoring data in accordance with the disclosed innovation. At 600, the system monitors itself or another system for a failure. The failure can be in the form of a total system failure or a less radical failure such as data and/or file corruption. At 602, if no failure is detected, flow loops back to the input of 600 to continue monitoring for a failure. If a failure is detected, flow is from 600 to 602 to initiate a data restore operation. At 604, a check is made for online (or available) access nodes. At 606, a check is then made of the most efficient means for retrieving the data from the available nodes. At 608, once the node or nodes are selected, data is retrieved from the selected system(s), and restored to the failed system, now back online and operational. At 610, the restored system can then be operated.

Figure 7:
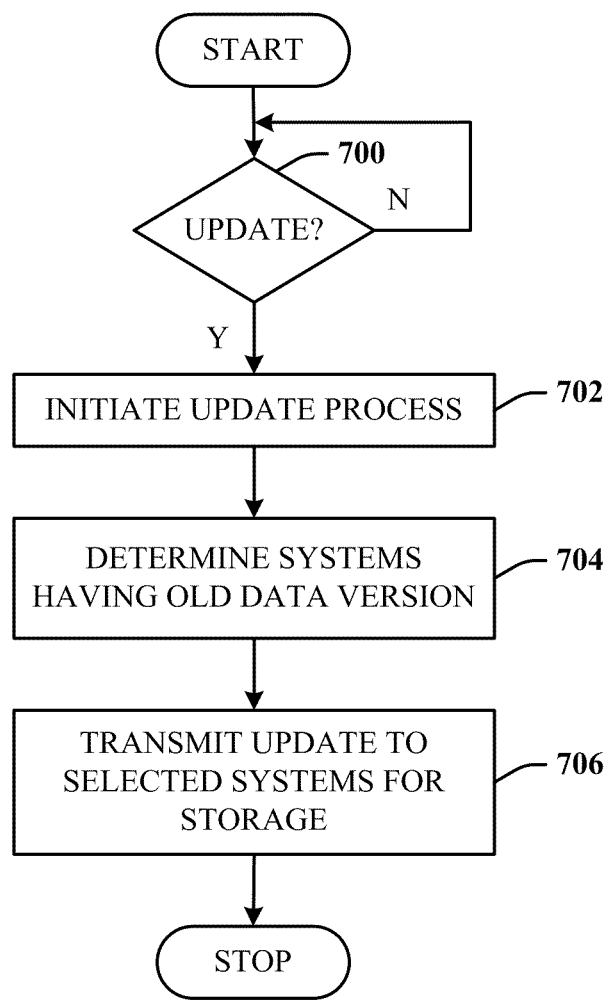
FIG. 7 illustrates a methodology of updating data of other systems in accordance with a disclosed aspect.

Referring now to FIG. 7, there is illustrated a methodology of updating data of other systems in accordance with a disclosed aspect. At 700, the system monitors itself or another system for updates. If no updates are detected, flow loops back to the input of 700 to continue monitoring for updates. If an update is detected, flow is from 700 to 702 to initiates an update process. At 704, the process can include checking which other systems hold data that needs to be updated with the latest version. At 706, once the appropriate systems are selected, the updated data is transmitted thereto, and the old data overwritten.

It is to be appreciated that not all updates are error-free, and can cause system faults or problems that are problematic. Thus, a latest update may need to be overwritten or downgraded to an earlier version that operates more error free. The "update" process can then include updating with an earlier and more stable version of data than the latest version.

Figure 8:
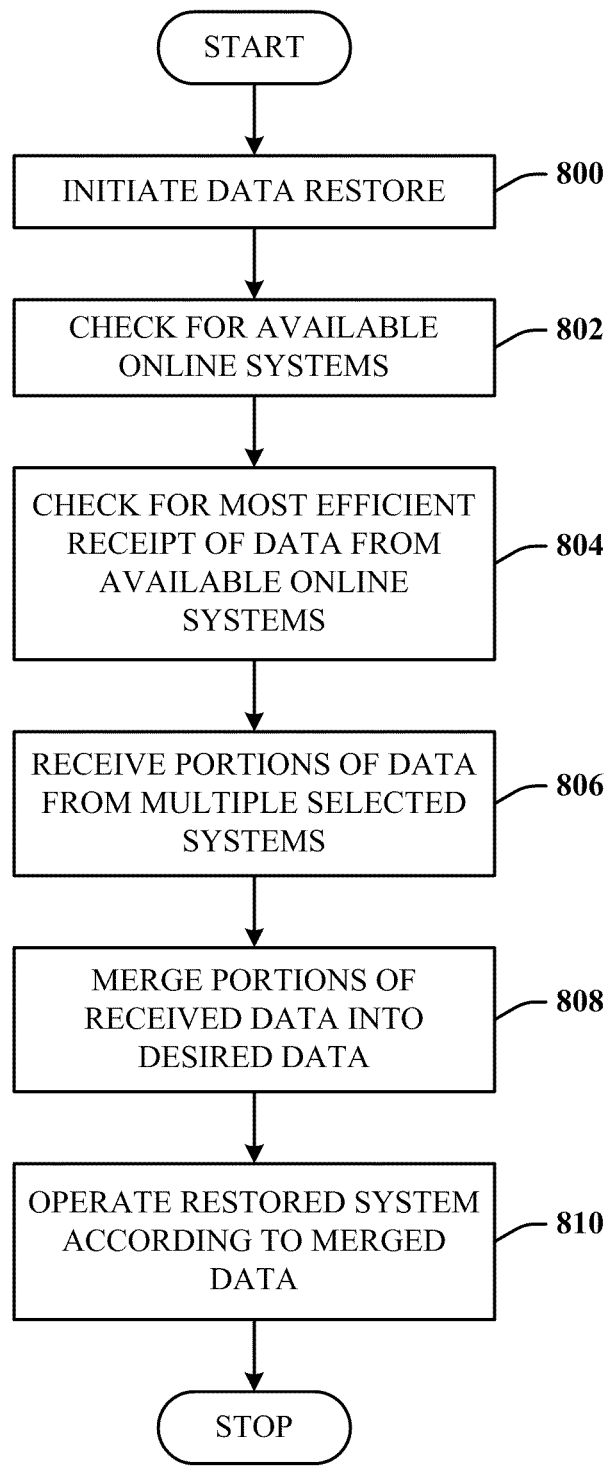
FIG. 8 illustrates a methodology of restoring data from multiple other systems in accordance with an aspect.

Referring now to FIG. 8, there is illustrated a methodology of restoring data from multiple other systems in accordance with an aspect. At 800, a data restore operation is initiated. At 802, a check is made for available systems. At 804, of the available systems, a check is made for the most efficient manner to receive the data from the available systems. Note that where all other systems are unavailable, this restoration process can include signaling an offline backup system to power-up, and then transmit the data therefrom to the system to be restored. At 806, if the most efficient manner is to receive the data from multiple available systems, a request for the data can be communicated to several nodes. At 808, once the data is received at the requesting system, a merge process can be conducted to merge all portions of the received data into the desired format to provide a complete dataset of the requested data. At 810, the system can then operate using the restored data.

Figure 9:
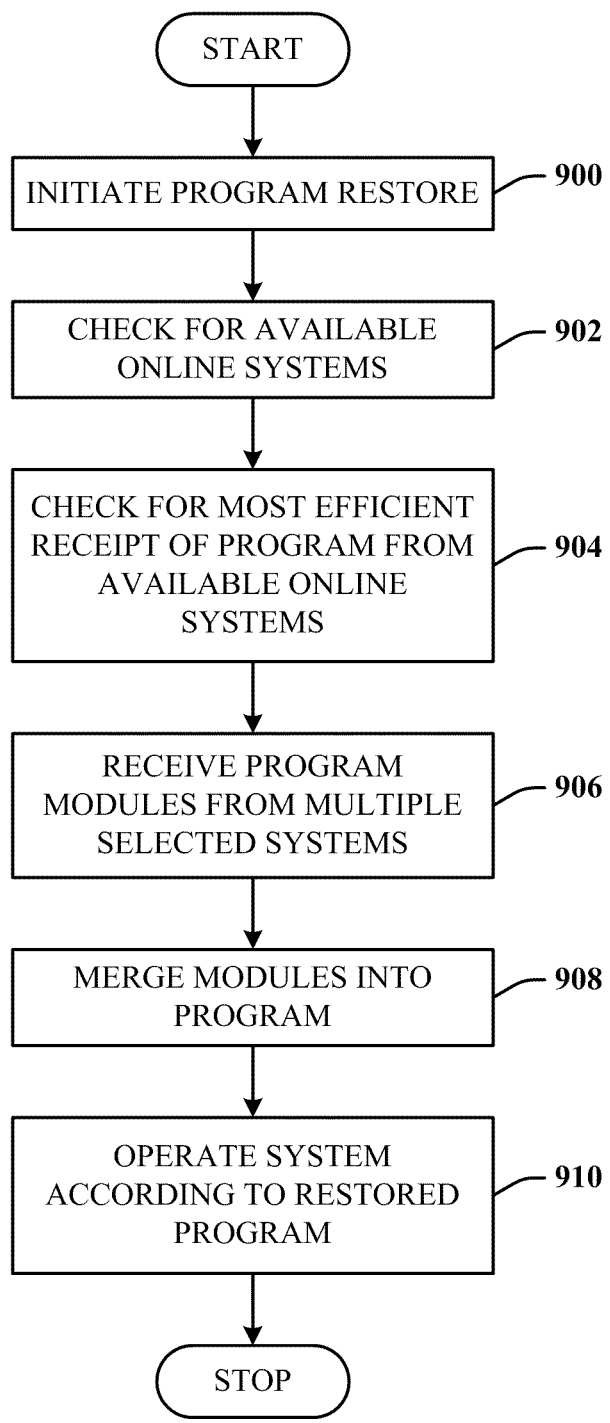
FIG. 9 illustrates a methodology of restoring a software program that includes modules which can be restored from multiple different systems in accordance with an aspect.

FIG. 9 illustrates a methodology of restoring a software program that includes modules which can be restored from multiple different systems in accordance with an aspect. At 900, a program restore operation is initiated. At 902, a check is made for available systems. At 904, of the available systems, a check is made for the most efficient manner to receive the program from the available systems. At 906, if the most efficient manner is to receive the program and/or program modules from multiple available systems, a request for the program can be communicated to several nodes. At 908, once the modules are received at the requesting system, a merge process can be conducted to merge all portions of the received program modules into the desired program to provide a complete operational program. At 910, the system can then operate using the restored program.

Figure 10:
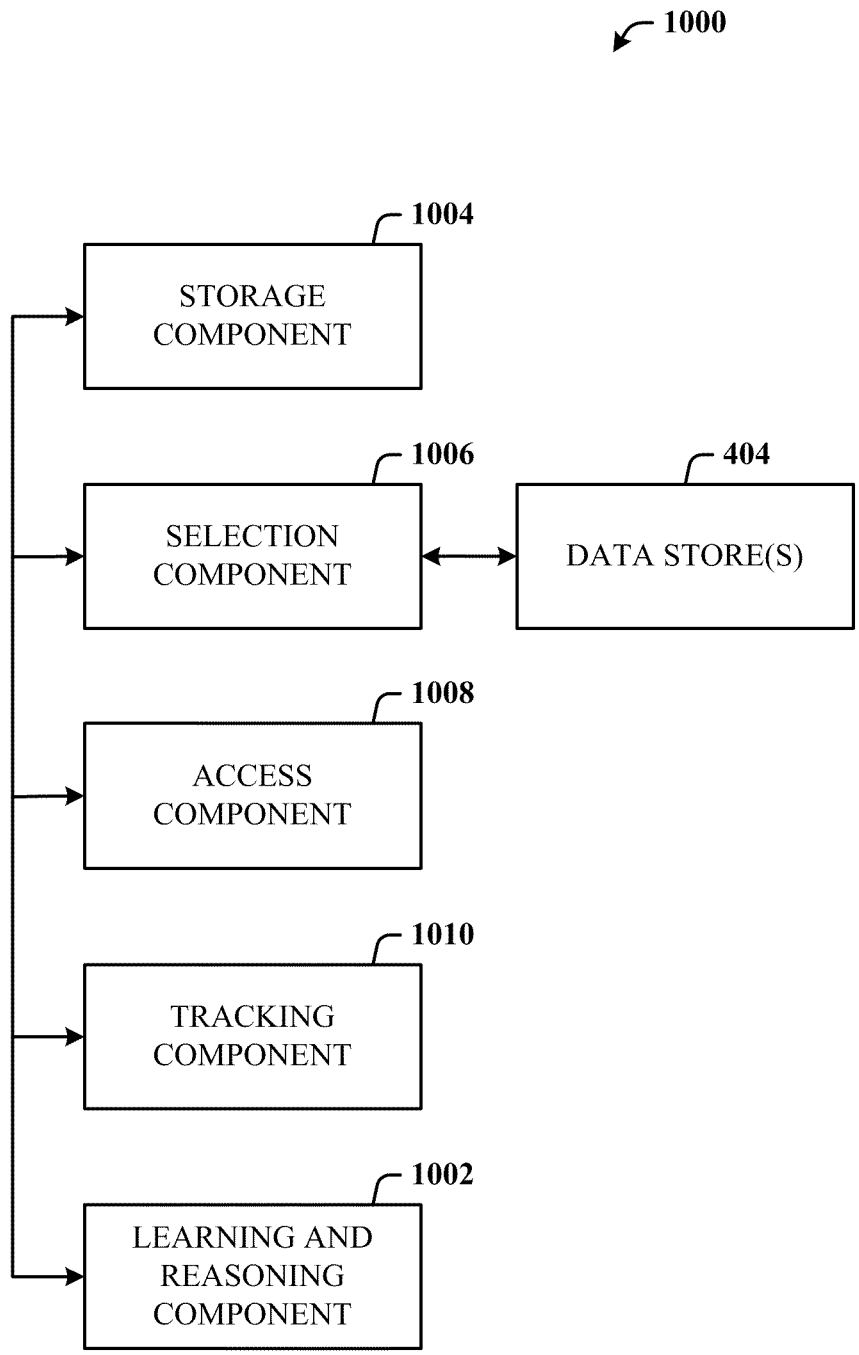
FIG. 10 illustrates a system that employs a learning and reasoning (LR) component which facilitates automating one or more features in accordance with the subject innovation.

FIG. 10 illustrates a system 1000 that employs a learning and reasoning (LR) component 1002 which facilitates automating one or more features in accordance with the subject innovation. The system 1000 can further include a storage component 1004 that facilitates storage and of data to selected data stores 404 (or system(s)), a selection component 1006 that selects which available systems 404 are to be used for storing data and retrieving data, an access component 1008 that facilitates access to the available system(s) for retrieving data, and a tracking component 1010 that tracks information associated with where data has been stored, which systems are available, user interactions with the systems, the number of data interactions that occur for any given data, updates that are required, and many other similarly related aspects.

The subject invention (e.g., in connection with selection) can employ various LR-based schemes for carrying out various aspects thereof. For example, a process for determining when a file should be updated can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=\text{confidence}(\text{class}(x))$. Such classification can employ a probabilistic and/or statistical-based analysis (e.g., factoring into the analysis utilities and costs) to prognose or infer an action that a user desires to be automatically performed. In the case of data systems, for example, attributes can be words or phrases or other data-specific attributes (e.g., data formats) derived from the words, and the classes are categories or areas of interest (e.g., levels of priorities).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including but not limited to assessing the best times at which a data restore and/or backup can be conducted, and estimating the cost at which a growing file will be best to backup rather than waiting to completion of the file change. The LR component 1002 can also track user and system interaction with screens and data, and based on this, prioritize the data for backup. This can also include backing the data up to systems will provide the fastest restore process. These prioritization criteria can also include system capabilities of all systems. For example, it would be preferred to back the most important large file data to a system that has larger processing capacity over a system that has limited processing capability. Similarly, it may be the more robust systems are employed for delicate process control operations, thus, it may not be desirable to backup data to such a system during a process operation, but to a lesser loaded machine at such time.

Figure 11:
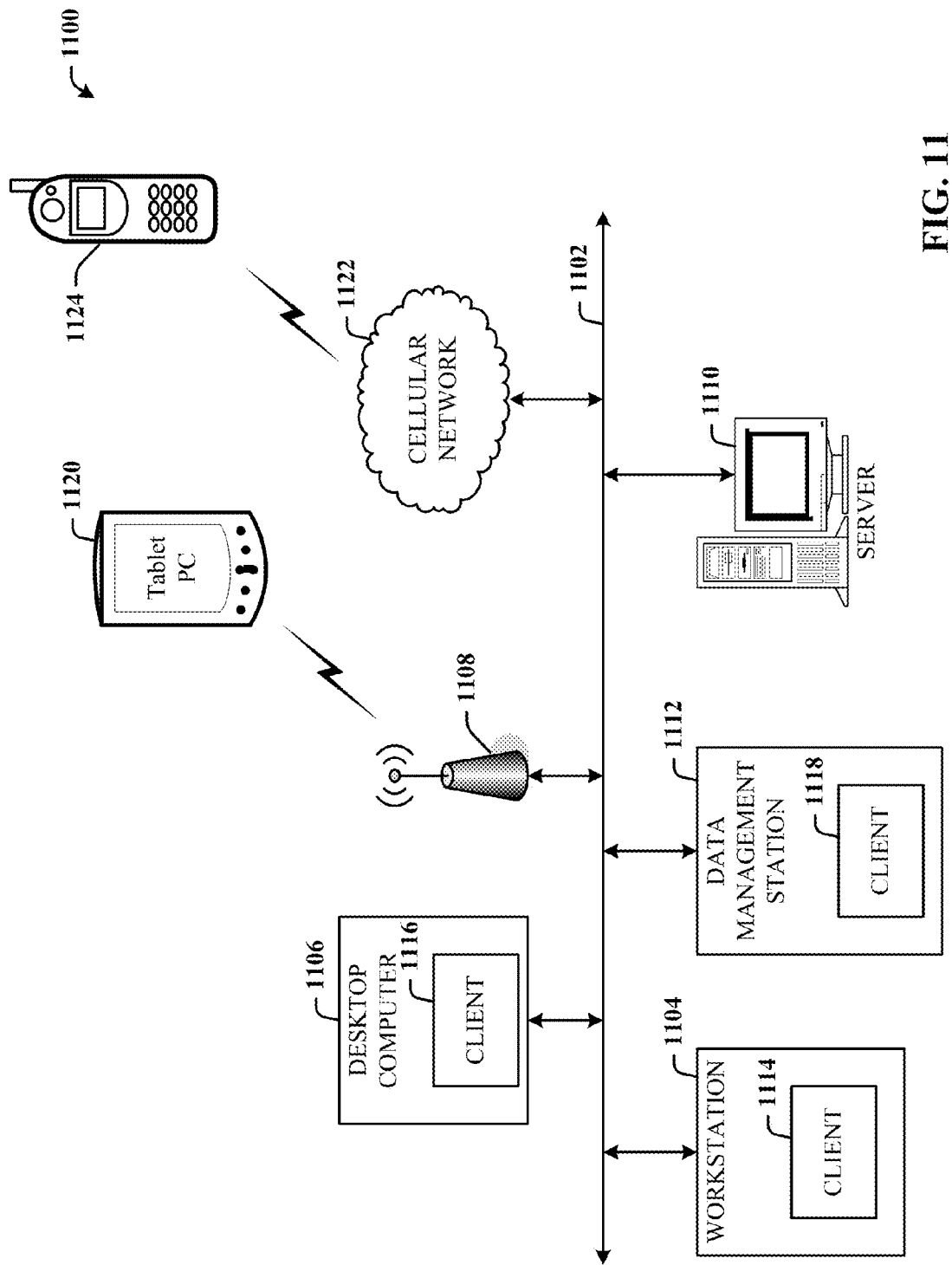
FIG. 11 illustrates a system that employs decentralized storage with multiple access paths in accordance with the subject innovation.

FIG. 11 illustrates a system 1100 that employs decentralized storage with multiple access paths in accordance with the subject innovation. The system 100 includes a network 1102 on which are disposed a number of access nodes: a workstation 1104, a desktop computing system 1106, a wireless access point 1108, a server 1110, and a data management station 1112. A number of the access nodes further include a client that facilitates data management for decentralized data backup and restore as described herein. For example, the workstation 1104 can include a workstation client 1114, the desktop computer 1106 can include a desktop client 1116, and the data management station 1112 can include a client 1118. The server 1110 need not include a client since data management can be accomplished by a remote station that includes a client.

The access point 1102 facilitates wireless communications to a wireless device (e.g., a tablet PC 1120) that can be used to store backup data. The wireless device can also include a client (not shown) that facilitates data restoration from other access nodes of the network 1102. The network 1102 can also interface to a cellular network 1122 in order to utilize a cellular device 1124 (e.g., a cell phone) as a backup system. Similarly, the cellular device 1124 can include a client (not shown) that facilitates data management in accordance with the subject invention.

Figure 12:
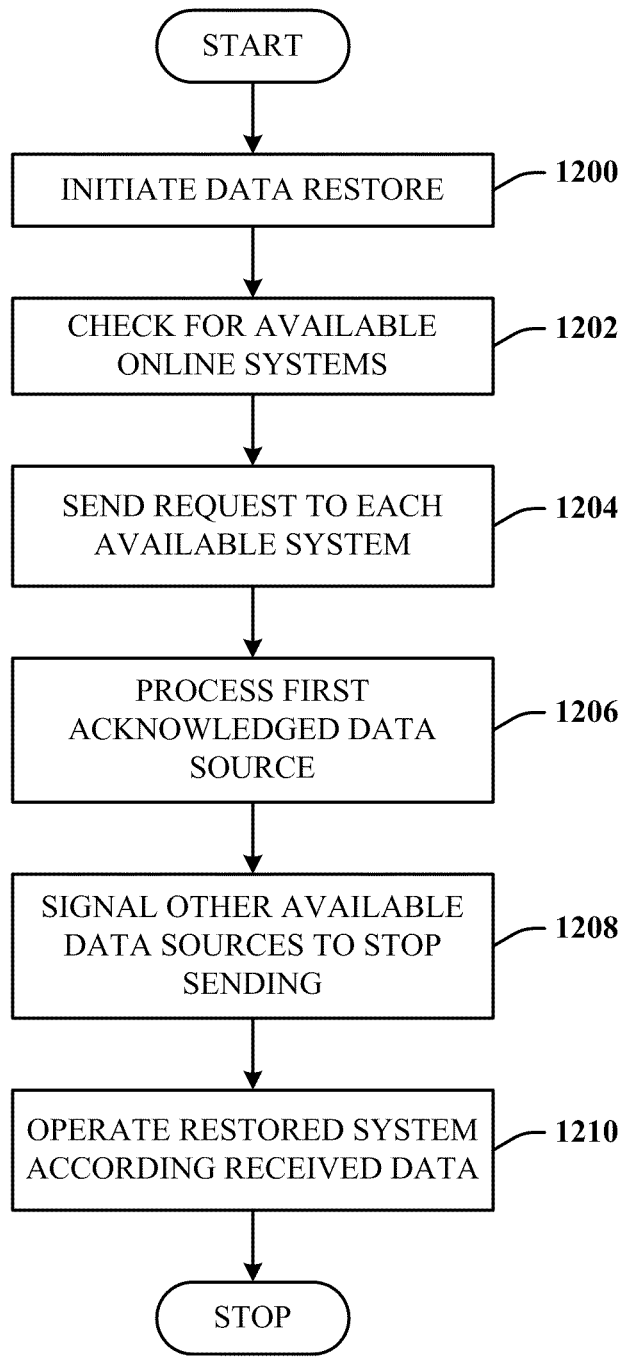
FIG. 12 illustrates a methodology of processing requests from multiple different systems in accordance with an aspect.

FIG. 12 illustrates a methodology of processing requests from multiple different systems in accordance with an aspect. At 1200, a data restore process is initiated. At 1202, a check for available systems is made. At 1204, a restore request is sent to each available system. At 1206, the requesting system begins to receive acknowledgments from the available systems. Once the first acknowledgment is received, the system can then signal the other systems to stop sending, as a way to more efficiently process the restore action, as indicated at 1208. At 1210, the restored system then operates according to the received data.

Figure 13:
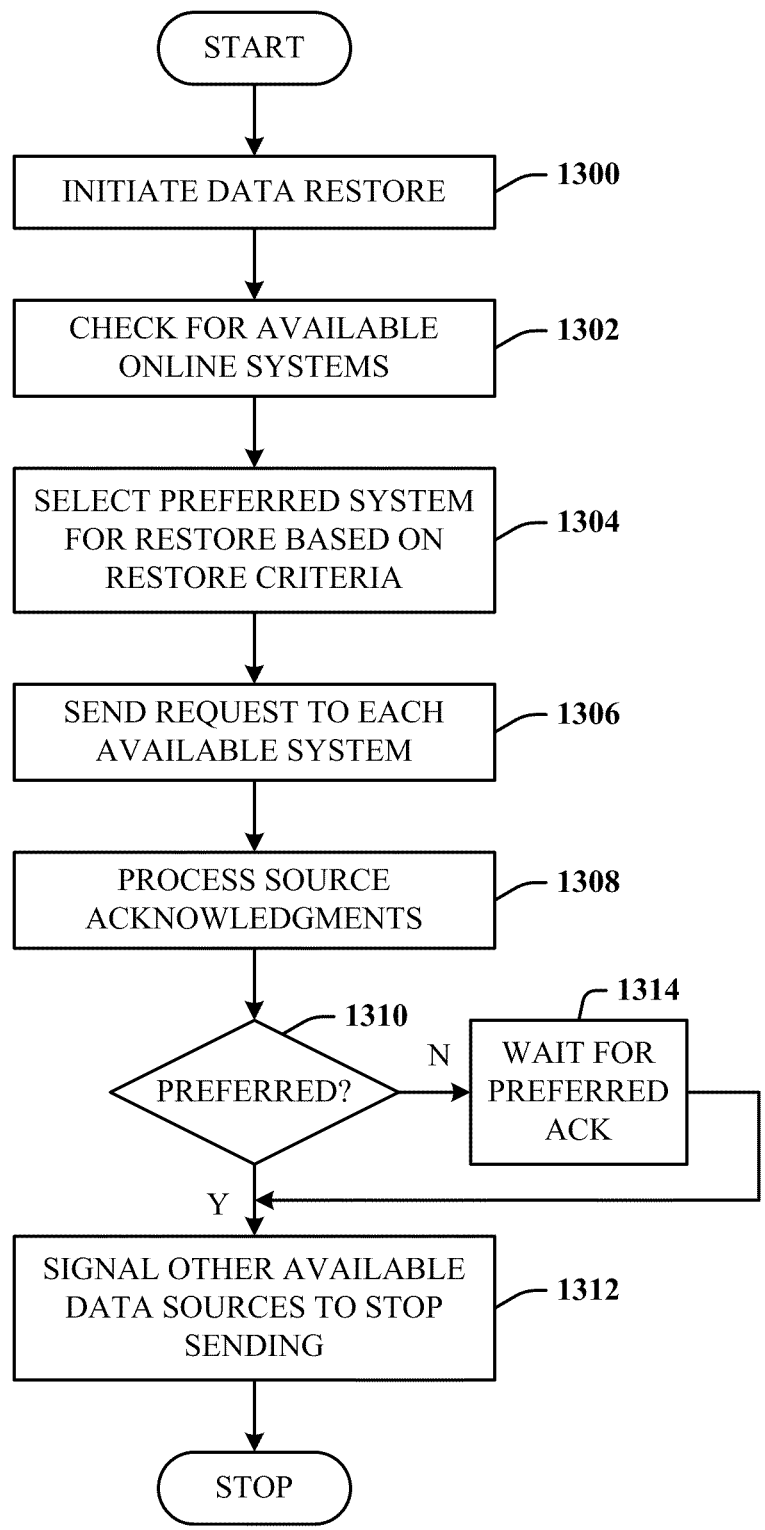
FIG. 13 illustrates a methodology of processing restore acknowledgments in accordance with a novel aspect.

FIG. 13 illustrates a methodology of processing restore acknowledgments in accordance with a novel aspect. At 1300, a data restore process is initiated. At 1302, a check for available systems is made. At 1304, a preferred system for restoration is selected of the available systems. At 1306, a restore request is sent to each available system. At 1308, the requesting system begins to receive and process acknowledgments from the available systems. At 1310, the system determines if the received acknowledgment is from the preferred source. If so, at 1312, the receiving system signals the remaining systems to stop sending. If the received acknowledgment is not from the preferred source, flow is from 1310 to 1314 to ignore the acknowledgment and wait until the preferred system responds.

It is to be appreciated that this preferential processing can include not only the preferred system, but a second preferred system, a third preferred system, and so on. Thus, where a large file is involved, only the data retrieval will be conducted according to the preferred systems (e.g., only the first, second and third systems).

In either case, the system can perform calculations and estimations of the cost to wait for a preferred system or systems to respond versus the time and reliable pathways that could have been taken for alternative system(s) to respond sooner, and made decisions that would abort the preferred systems and utilize the lesser systems for the restore operation.

Figure 14:
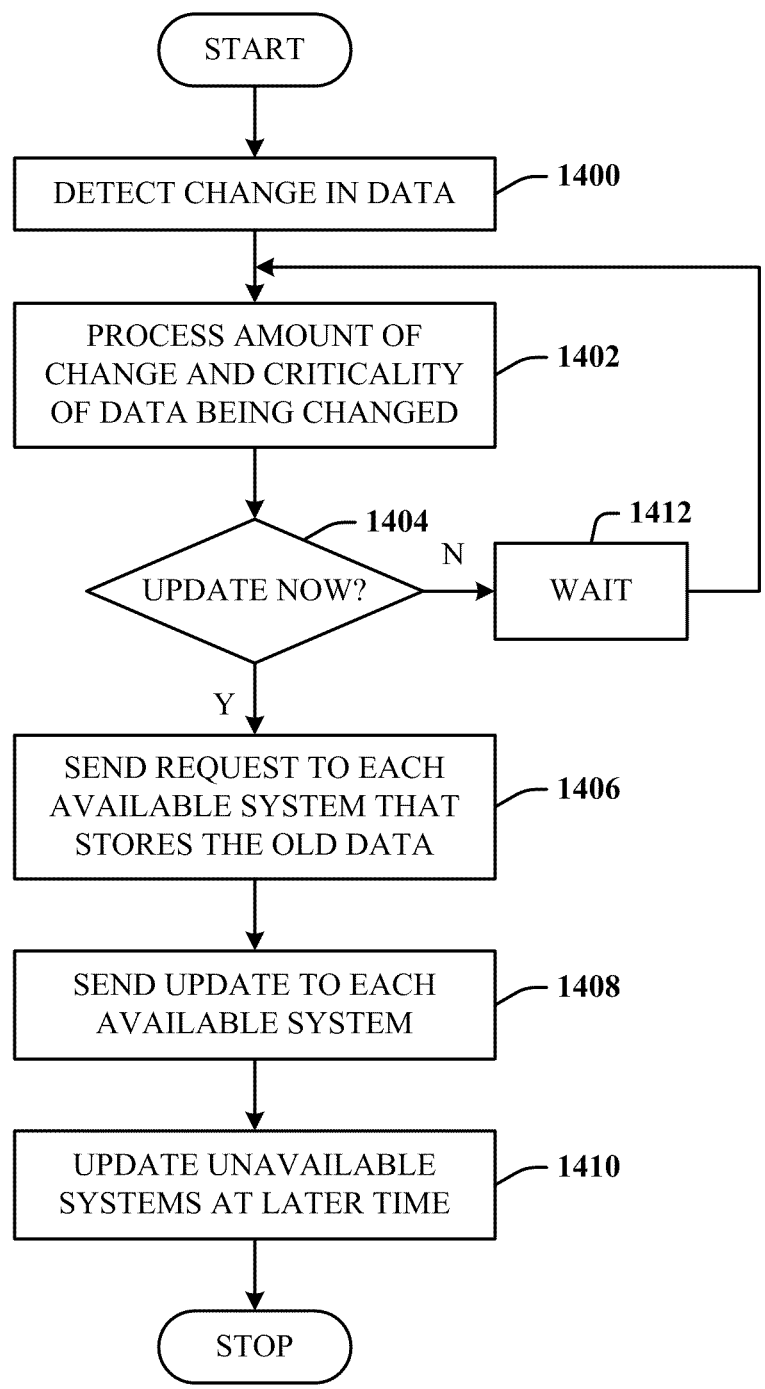
FIG. 14 illustrates a methodology of updating backed up data based on the amount of change and/or criticality of the data to the system.

FIG. 14 illustrates a methodology of updating backed up data based on the amount of change and/or criticality of the data to the system. At 1400, a change in data I detected by the system. At 1402, the system processes this change to determine the amount of change and the value (or the criticality) of the data to the overall system and/or process operation. At 1404, if the amount of change and/or the value (or the criticality) of the data is deemed to be high, flow is to 1406 to send requests to the available systems that store the old data. At 1408, updated data is sent to each available system. For those systems that store the old version, but are offline or unavailable, the update process can be initiates to only those systems at a later time, as indicated at 1410. If, at 1404, the system determines not to update at this time, flow is to 1412 to wait until the amount of change reaches a level that warrants an update and/or backup process. Flow then proceeds back to 1402.

Figure 15:
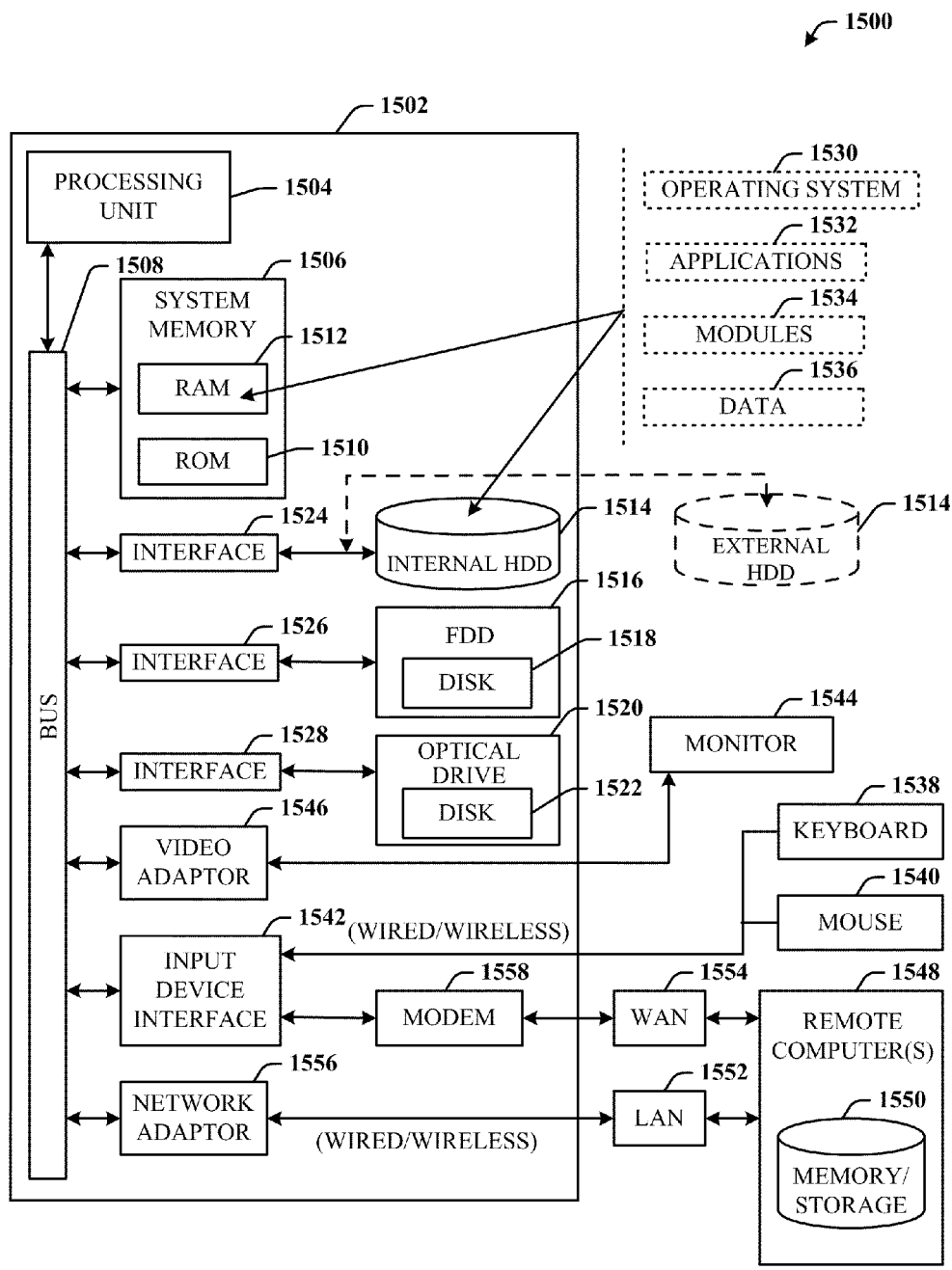
FIG. 15 illustrates a block diagram of a computer operable to execute the disclosed architecture.

Referring now to FIG. 15, there is illustrated a block diagram of a computer operable to execute the disclosed architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 16:
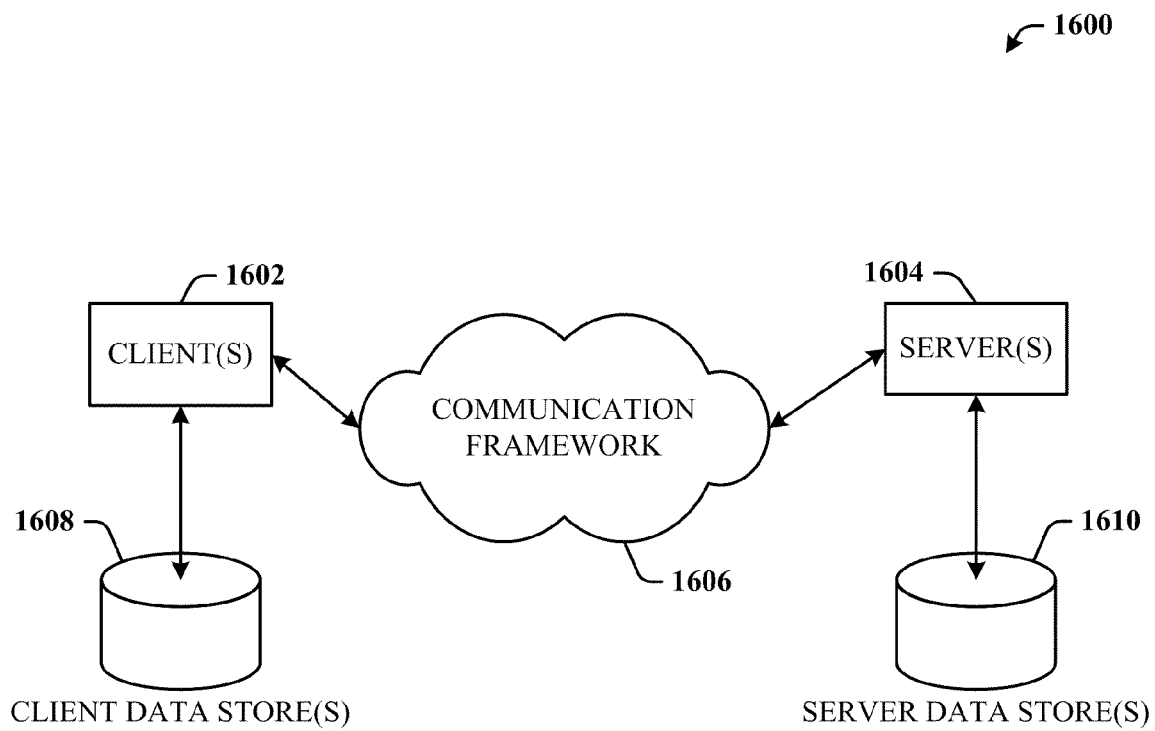
FIG. 16 illustrates a schematic block diagram of an exemplary computing environment.

Referring now to FIG. 16, there is illustrated a schematic block diagram of an exemplary computing environment 1600 in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

Figure 17:
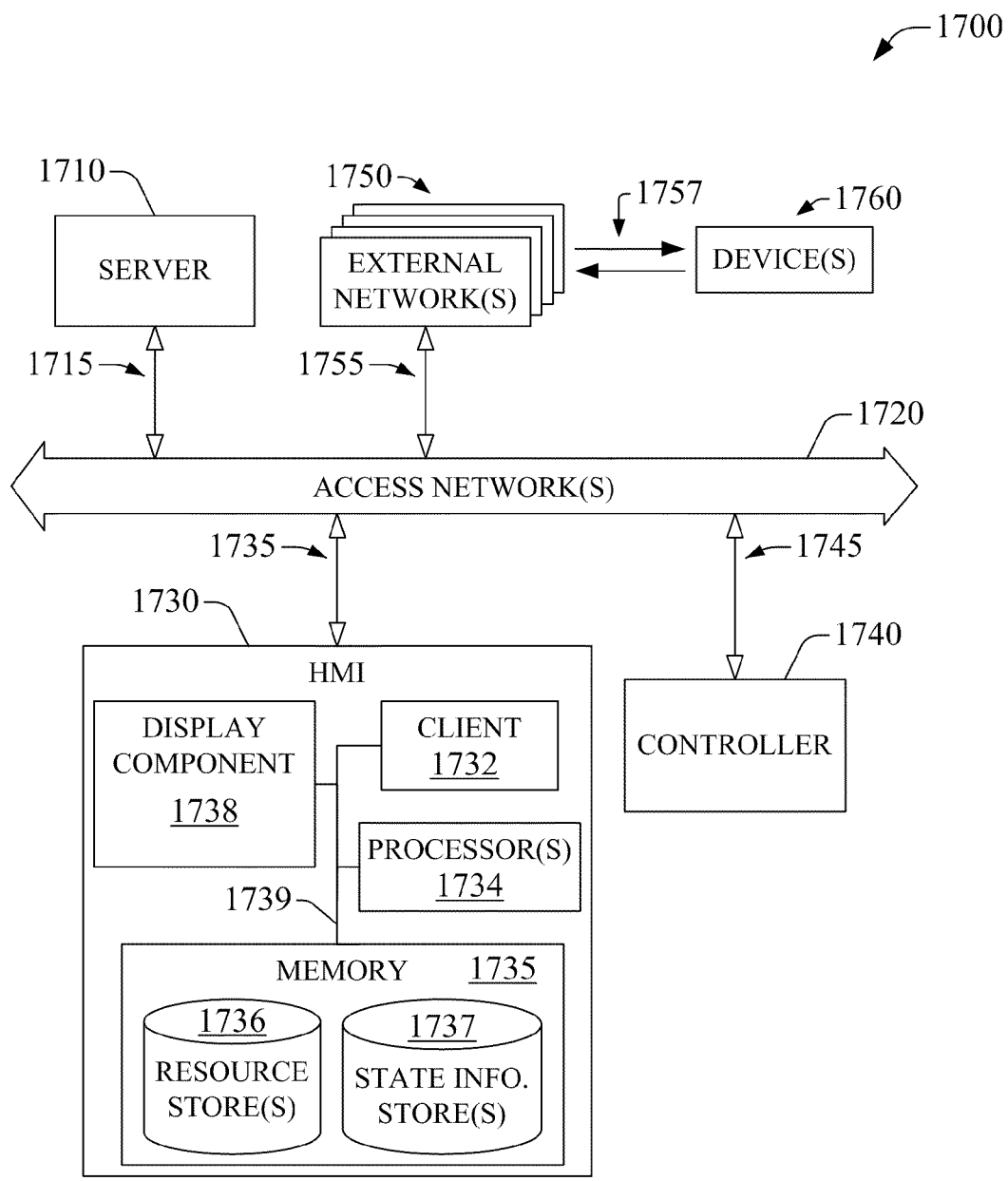
FIG. 17 is a block diagram of an integrated control system with precursor architecture to enable peer-to-peer distribution of data in accordance with aspects of the subject innovation.

FIG. 17 is a block diagram of an integrated control system 1700 with a precursor architecture that can enable peer-to-peer distribution of data in accordance with aspects of the subject innovation. In one or more embodiments, control system 1700 is an industrial control system or automation control system, which typically includes a control environment (not shown) comprising a set of industrial controllers, a plant, a set of tools or machines, equipment, a group of sub-systems, industrial processes carried out by one or more apparatuses, or the like. One or more of the access nodes (e.g., workstation 1104, desktop computer 1106, data management station 1112 . . . ) described in connection with example system 1100 also can be part of control system 1700. In an aspect of the subject innovation, data that can be distributed in peer-to-peer mode is characterized as data resources that can have disparate granularity. The granularity is determined by data format layout (e.g., field, class, data field, instruction, memory address . . . ) or data storage layout, such as high-level resident data (file, database, etc.) or low-level resident data, e.g., memory resident data such as pointer, memory address, multi-bit word, or the like. Data resources include control data and graphic data. In particular, though not exclusively, data resources comprise files; control screens; control projects; instructions; data structures, such as graphic data objects and control data objects; state information; memory tags; memory addresses; or the like.

Control system 1700 integrates administration environment, visualization environment, and control environment. In an aspect, integration is accomplished through access network(s) 1720 and specific interfaces that functionally connect each of the foregoing environments to such access network(s). In one or more scenarios, access network(s) 1720 can embody network 1102. Access network(s) 1720 can be geographically distributed and can include a plurality of wireline networks and wireless networks that operate in accordance with various bandwidths and disparate protocols for example, packet-based protocols such as internet protocol (IP), X.25, Asynchronous Transfer Mode (ATM) protocol, frame-based protocols such as frame relay, and circuit-switched protocols) include service network(s) and control network(s). Service network(s) comprise network(s) for communication of data that includes management data, graphic data, or control data, whereas control network(s) primarily administer control data and data transactions related to a control environment. Distinction amongst service network(s) and control network(s) can enable improved integration of various functional elements within the control environment: For example, different parts of the control environment can be linked through custom or legacy control network(s), while exchange of information amongst the control environment and other network elements, such as server 1710, can be implemented through non-proprietary service network(s) (e.g., an Ethernet network). It should be appreciated that in one or more embodiments, the service network(s) and the control network(s) are both embodied in the same physical network. Interface(s) 1715, interface(s) 1735, and interface(s) 1745 functionally couple access network(s) 1720 to server 1710 in administration environment, HMI 1730 in a visualization environment, controller 1740 in a control environment, respectively. In addition, administration environment, visualization environment, and control environment are communicatively coupled via access network(s) 1720, through interface(s) 1755, to external network(s) 1750, which operate as service network(s). The various interface(s) herein include one or more servers that provide a plurality of services, including security services (firewall deployment, data encapsulation, authorization and access services, etc.). In one or more scenarios, external network(s) 1750 include enterprise network(s) such as business management network(s) or vendor network(s). External network(s) 1750 enable communication of functional elements (e.g., HMI 1730) in administration environment, visualization environment and control environment with device(s) 1760, mobile or otherwise; device(s) 1760 functionally connected to external network(s) 1750 via wired or wireless link(s) 1757.

Server 1710 can configure at least one controller (e.g., 1740) to regulate related control process(es). In an aspect, server 1710 can generate and supply control project(s) to controller 1740 to configure control features. In addition, server 1710 can configure one or more terminals, such as HMI 1730, to render control data in accordance with various control processes and related controller(s). In view of the network integration afforded by control system 1700, a remote device within device(s) 1760, also can configure controller 1740 through server 1710. Server 1710 can retain data resource(s) associated with configured control process(es) and controller(s). In one or more scenarios, server 1710 can be embodied, at least in part, in computer environment 1500.

Controller 1740 also includes processor(s) (not shown), volatile and non-volatile memory (not shown), and other circuitry (not shown) that enables implementation of control process(es) (e.g., execution of control logic, or control code instructions) related to a specific control environment (not shown in FIG. 17). In one or more embodiments of the subject disclosure, controller 1740 can be an industrial controller or an automation controller. Generally, industrial or automation controllers are purpose-specific processing devices employed to regulate automated or semi-automated entities such as industrial processes, machines, manufacturing equipment, plants, or the like. A typical industrial controller or automation controller executes (through a processor, for example) control logic to measure one or more variables and/or inputs representative of a status of a controlled entity, and/or effectuate outputs associated with control of the entity. Such inputs and outputs can be digital and/or analog. Inputs and outputs are not shown in FIG. 17 for the sake of simplicity.

HMI 1730 can render control data associated with various control processes regulated through controller 1740. To at least that end, HMI 1730 includes a display component 1738 that can render one or more user interfaces through visual or aural indicia. The one or more user interfaces can be associated with one or more sets of control screens, and rendered in accordance with at least one of graphical objects or gesture objects that compose the control screen(s) in the sets of control screens. Various schemes can be employed to render the one or more user interface(s) or other content(s) such as window-based schemes, e.g., iconic representation, pop-up representation of indicia; or text-based representation, with scroll-down or scroll-sideways delivery, or static rendering. In addition, the one or more user interface(s) or other content(s) can be organized in various configurations within a rendering area (e.g., display screen) that can be a part of display component 1738. In an aspect, display component 1738 can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like. Display component 1738 also can enable data entry from an end-user; display component 1738 can receive data input through various user-interface interaction modalities, such as speech gestures, motion gestures, touch gestures, and conduits, for example, keyboards, keypads, touch screens, microphones, cameras, or the like.

In addition, HMI 1730 includes a client component 1732, also referred to herein and in annexed drawings as client 1732, that can receive and convey data and signaling in accordance with various aspects described herein. In contrast to, and as advantage with respect of, conventional operation of HMIs in typical control environment, HMI 1730 can access and be accessed by one or more device(s) 1760, which can include enterprise devices.

HMI 1730 also includes processor(s) 1734 and memory 1735. Processor(s) 1734 can be configured to execute or can execute code instructions (not shown) stored in memory 1735 to implement or provide at least part of the described functionality of HMI 1730. Such code instructions can include program modules or software or firmware applications that implement specific tasks which can be accomplished through one or more of the methods described in the subject specification and that are associated, at least in part, with functionality or operation of control system 1700. Moreover, in some embodiments, client 1732 can be implemented as software or firmware that can reside in memory 1735 as one or more sets of code instructions that, when executed by processor(s) 1734, implement client 1732 and functionality thereof as described herein in various aspects. In an aspect, to provide such functionality, processor(s) 1743 can exploit bus 1739 to exchange data or any other information amongst functional elements (e.g., client 1732) within HMI 1730 and memory 1735 or elements therein. Bus 1739 can be embodied in at least one of a memory bus, a system bus, an address bus, a message bus, or any other conduit, protocol, or mechanism for data or information exchange among components that execute a process or are part of execution of a process. The exchanged information can include at least one of code instructions, code structure(s), data structures, or the like.

Memory 1735 also can retain data resource(s) retrieved or received at least from controller 1740 or other controller(s) (not shown). In the illustrated embodiment, the data resource(s) can be retained in resource store(s) 1735. In addition to, or as part of, stored data resources, memory 1735 also can retain state information within state information (info.) store(s) 1737. In an aspect, memory 1735 can include various graphic data objects or gesture data objects (e.g., data objects that can enable interaction with HMI 1730 through one or more gestures such as motion, speech, or touch). At least one of the graphic data objects or gesture data objects can be part of one or more control screens associated with control process(es) regulated through controller 1740 or other controllers (not shown). In one or more embodiments, such graphic data objects or gesture data objects, or control screens can be stored within resource store(s) 1736.

As described below, through peer-to-peer exchange, HMI 1730 also can render control data originated in disparate controller(s) (not shown in FIG. 17). Interface(s) 1735 (e.g., network adaptor(s), port(s), reference link(s) . . . ) enable communication with controller 1740 via access network(s) 1720 and interface(s) 1745; likewise interface(s) 1735 enables, in part, communication with other controller(s) (not shown).

In one or more scenarios, HMI 1730 can be embodied, at least in part, in computer environment 1500. It should be appreciated that while various aspects or features of the subject disclosure are described in connection with various HMIs (e.g., HMI 1730, HMIs 1824$_1$-1824$_Q$) and respective clients therein (e.g., client 1732, clients 1826$_1$-1826$_Q$), such aspects or features described herein also can be implemented or accomplished in control systems in which a terminal (e.g., a workstation, a desktop computer, a mobile computer, a smartphone) that can render control data embodies a HMI. When networked as described herein, a server, a HMI, a controller (e.g., industrial controller, automation controller), a terminal, a device, an access point, or the like, are referred herein to as a node, or access node. The various memories available in control system 1700 can be embody, at least in part, data store(s) 404.

Figure 18:
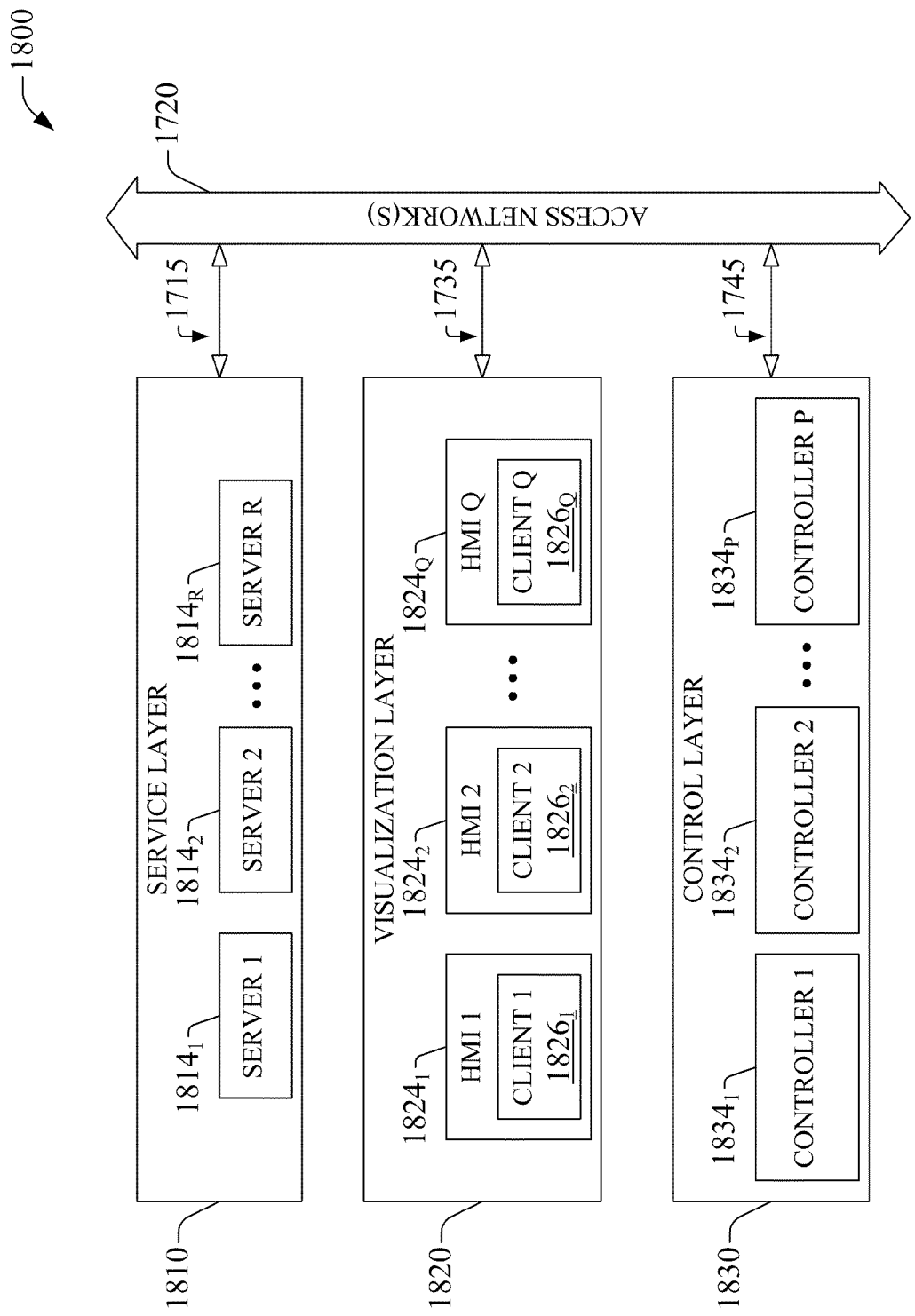
FIG. 18 is a block diagram of an example control system that enables peer-to-peer distribution of data resources in accordance with aspects described herein.

FIG. 18 is a block diagram of an example control system 1800 that enables peer-to-peer distribution of data resources, or resources, in accordance with aspects described herein. In one or more embodiments, control system 1800 is an industrial control system or automation control system, which typically includes a control environment (not shown) comprising a set of industrial controllers, a plant, a set of tools or machines, equipment, a group of sub-systems, industrial processes carried out by one or more apparatuses, or the like. The server-client system comprises a service layer 1810 that includes a set of R servers $\mathbf{1814_1}$-$\mathbf{1814_R}$, with R a natural number greater or equal than unity, and a visualization layer 1820 that includes a set of Q HMIs $\mathbf{1824_1}$-$\mathbf{1824_Q}$, with Q a natural number greater or equal than unity. HMI $\mathbf{1824_\lambda}$ includes client $\mathbf{1826_\lambda}$, with $\lambda=1, 2 \ldots Q$. As indicated supra, in one or more embodiments, visualization layer 1820 can comprise a set of Q terminals (e.g., a desktop computer, a mobile computer, a smartphone) that can render control data, each terminal including a client component. As an illustration, visualization layer 1820 can be composed of networked workstations, such as workstation 1104. It is noted that such terminals deployed in visualization layer 1820 can be disparate; e.g., a group of desktop computers, a group of workstations, and a group of HMIs can embody the set of HMIs $\mathbf{1824_1}$-$\mathbf{1824_Q}$. Service layer 1810 and visualization layer 1820 are functionally connected (e.g., communicatively coupled) through access network(s) 1720. Likewise, control layer 1830 is functionally coupled to service layer 1810 and visualization layer 1820 via access network(s) 1720; control layer 1830 includes P controllers $\mathbf{1834_1}$-$\mathbf{1834_P}$, with P a natural number greater or equal than unity. Communication and information exchange within each layer in control system 1800 is accomplished through access network(s) 1720 and interface(s) 1715, 1735, and 1745). Various memories available in control system 1800 and associated with service layer, visualization layer, and control layer can be embody, at least in part, data store(s) 404. In one or more embodiments of the subject disclosure, controllers $\mathbf{1834_1}$-$\mathbf{1834_P}$ can be industrial controllers or an automation controllers, as described supra. In addition, each of the controllers $\mathbf{1834_1}$-$\mathbf{1834_P}$ includes processor(s) (not shown), volatile and non-volatile memory (not shown), and other circuitry (not shown) that enables implementation of control process(es) (e.g., execution of control logic, or control code instructions) related to a specific control environment (not shown in FIG. 18).

Association amongst servers $\mathbf{1814_1}$-$\mathbf{1814_R}$ and HMIs $\mathbf{1824_1}$-$\mathbf{1824_Q}$ can be a one one-to-many relationship or a one-to-one relationship. Servers $\mathbf{1814_1}$-$\mathbf{1814_R}$, HMIs $\mathbf{1824_1}$-$\mathbf{1824_Q}$, and controllers $\mathbf{1834_1}$-$\mathbf{1834_P}$ can be distributed in disparate geographic locations. Accordingly, disparate functional elements of access network(s) 1720 enable communication, and related exchange of data or information, amongst two or more of servers located in disparate geographic regions. In addition, such functional elements of access network(s) 1720 can enable communication, and related exchange of data or information, amongst two or more clients that reside in disparate geographical locations.

In an aspect of the subject disclosure, for communication purposes, and related exchange of data, each layer operates as a single logical unit. Thus, communication amongst disparate layers is carried out in the same or substantially the same manner irrespective of geographical location of the functional elements (e.g., HMI 2 $\mathbf{1824_2}$ and controller P $\mathbf{1834_P}$) that exchange data. In addition, a client (e.g., $\mathbf{1826_1}$) in a local HMI (e.g., $\mathbf{1824_1}$) can access data available in the local HMI in the same or substantially the same manner as data available in a remote HMI (e.g., $\mathbf{1824_Q}$). Similarly, data available in one or more servers in service layer 1810 appears logically the same to local HMI(s) and remote HMI(s) within visualization layer 1820.

Deployment of servers $\mathbf{1814_1}$-$\mathbf{1814_R}$ within service layer 1810 enables peer-to-peer exchange of data resource(s), also referred herein as resource(s), amongst two or more of the servers. Such peer-to-peer server exchange of resource(s) can afford the resource(s), e.g., state information, to be available to any or substantially any HMI, or terminal, within visualization layer 1820: Peer-to-peer server exchange of information allows the information to be available to any or substantially any client. In contrast to conventional backup systems (e.g., server backup pairs or other redundancy schemes), preservation of resource(s) is dynamic as opposed to be dictated by a static backup configuration scheme. In an aspect, dynamic preservation, or dynamic replication, of information can be driven, or triggered, by (1) events, such as updates to replicated resource(s) (e.g., changes to state information, alarm conditions); (2) ad hoc redistribution of the information in a cluster of servers within the service layer; or (3) addition of a server to the service layer. As discussed supra, peer-to-peer exchange of resource(s) can render control system 1800 fault tolerant or resilient with respect to unavailability of resource(s) due to failure of one or more functional elements of system 1800. In particular, though not exclusively, exchanged information can be embodied in state information for a specific controller (e.g., controller $\mathbf{1834_2}$) or related control environment; thus, substantially all or all clients (e.g., clients $\mathbf{1826_1}$-$\mathbf{1826_Q}$) can access the state information. In a scenario, pervasive or redundant state information availability can enable a HMI, or terminal, associated with a client to maintain visualization of a control process in case a disparate HMI directly associated (e.g., locally deployed) with a controller that effects the control process fails or otherwise becomes unavailable.

With respect to (1), as discussed supra in connection with related FIGS. 7 and 14, if a data resource is updated (e.g., modified or deleted) in a server (e.g., server $\mathbf{1814_8}$) within service layer 1810, the update can be replicated in a group of one or more servers within service layer 1810 (for example, the group encompasses all servers $\mathbf{1814_1}$-$\mathbf{1814_R}$) and thus at least one of clients $\mathbf{1826_1}$-$\mathbf{1826_Q}$ access the same data resource. In one or more embodiments of a server within service layer 1810, e.g., server 1910 in example embodiment 1900 presented in FIG. 19, collection component 1914 can receive a replica of updated resource(s) from a first disparate server and retain the replica in memory 1940 within resource store(s) 1942, whereas distribution component 1920 can deliver updated resource(s) to a second disparate server. The first disparate server can be same as the second disparate server. The updated resource(s) or replica thereof can be embodied in state information, such as an alarm condition, or one or more memory tags specific to control project(s) in one or more controllers (e.g., $\mathbf{1834_1}$-$\mathbf{1834_P}$); memory tag(s) can be retained in memory element(s) 1944. In a scenario, server 1910, through distribution component 1920, for example, can partition state information in a plurality of portions and deliver the plurality of portions to respective servers with service layer 1810. Collection components in each of the respective servers can receive a portion of the state information and thus the state information can be retained in multiple servers; one of the respective collection components can integrate, and thus recover, the partitioned state information.

In connection with (2), a group of one or more servers that receive updated data resource(s) need not be configured as a destination server(s) of a replica. In addition, replication of data resource(s) can be accomplished without reliance on a master server: A server can receive an updated data resource and relay it based in part on one or more replication criteria (e.g., a safety criterion; not shown) in order to increase availability of the updated data resource and resilience, or robustness, of service layer 1810 with respect to data corruption of data failure.

In reference to item (3), addition of a server to service layer 1810 can result in deployment of data resource(s) to the added server. This feature of the subject disclosure can improve scalability of service layer 1810. In one or more embodiments, e.g., embodiment 1900, distribution component 1920 can deliver one or more data resources to the added to server in response to such addition. Configuration component 1928 in the added server can broadcast an indication to at least one server in service layer 1810 that the added server is available to receive data resource(s); the indication can include a logical address (e.g., internet protocol (IP) address) of the added server for identification thereof. In the subject disclosure, indication(s), request(s) or the like can be delivered in accordance with various transport protocols and associated formats for communication of data. The data resource(s) can be distributed. In addition, the supplied data resource(s) can be retained in resource store(s) 1942; state information can be retained in a dedicated memory element 1946 to improve delivery performance of state information, particularly although not exclusively in control environments in which state information is highly dynamic.

In server 1910, processor(s) 1932 can be configured to execute or can execute code instructions (not shown) stored in memory 1940 to implement or provide at least part of the described functionality of server 1910, which is an example embodiment of any server disclosed herein. Such code instructions can include program modules or software or firmware applications that implement specific tasks which can be accomplished through one or more of the methods described in the subject specification and that are associated, at least in part, with functionality or operation of control system 1800 and server(s) therein. Moreover, in some embodiments, the various components of server 1910 can be implemented as software or firmware applications that can reside in memory 1940 as one or more sets of code instructions that, when executed by processor(s) 1932, implement such various components and the functionality thereof as described herein in various aspects. I/O interfaces 1936 can enable exchange of information, e.g., data resources, and can be part of interface(s) 1745.

In an aspect, to provide at least part of functionality of server 1910, processor(s) 1932 can exploit bus 1937 to exchange data or any other information amongst functional elements (e.g., components) within server 1910 and memory 1940 or elements therein. Bus 1937 can be embodied in at least one of a memory bus, a system bus, an address bus, a message bus, or any other conduit, protocol, or mechanism for data or information exchange among components that execute a process or are part of execution of a process. The exchanged information can include at least one of code instructions, code structure(s), data structures, or the like.

With respect to HMIs, or terminals that render control data, two or more clients in visualization layer 1820 also can exchange data resource(s) (e.g., graphical objects, state information, alarm conditions . . . ) in peer-to-peer mode. Thus, data resource(s) available to or deployed in a specific HMI, or terminal that renders control data, can be replicated in one or more clients within visualization layer 1820. Such peer-to-peer exchange or distribution is based on client-client interaction as opposed to a server-client interaction as it generally occurs in some conventional web-based systems for access to remote data. In an aspect, data resource(s) can be distributed amongst a plurality of HMIs, or terminals, in response to, or triggered by, addition of a HMI, or a terminal, within visualization layer 1820. A client that resides within a HMI, or terminal, within visualization layer 1820 can deliver or receive an indication (e.g., an instruction, a data packet, a light-payload file (e.g., a cookie), an email communication, an instant message, a set of bits . . . ) a HMI, or terminal, has been added to the visualization layer 1820. In response to reception of the indication, the client in the HMI, or the terminal, can deliver one or more data resources to the added HMI, or terminal, identified in the indication. In one or more embodiments, the indication that a HMI, or terminal, has been added to visualization layer 1820 can be generated and delivered (e.g., broadcasted), at least in part, via a client that resides within the added HMI, or terminal; the indication can be delivered to at least one HMI, or terminal, within visualization layer 1820; the indication can include a logical address (e.g., internet protocol (IP) address) of the added HMI, or terminal, for identification thereof to its peers. In another aspect, data resource(s) can be distributed amongst a set of HMIs, or terminals, within visualization layer 1820 in response to an update of one or more data resources available to a HMI, or terminal; as an example, update of a control screen in HMI can trigger distribution of the updated control screen or graphic object(s) therein.

As indicate supra, an exchanged data resource can include a control screen or one or more graphical objects that compose a control screen. In an aspect, exchange of the control screen or graphical object(s) thereof also can include exchange of information, such as metadata, that identifies control data that is bound to the control screen or the graphical object(s) thereof. As an example, if a client (e.g., 1826$_1$) distributes to its peers (e.g., 1826$_2$ and 1826$_Q$) a graphical object that allows rendering of temperature in a control environment, distribution of such graphical object also can include metadata that conveys a temperature value is bound to the graphical object. A client within a HMI, or terminal the renders control data, can retrieve or receive metadata that describes or otherwise characterizes control data from a controller (e.g., 1834$_2$) or memory tag(s) or control project(s) therein.

Peer-to-peer distribution of control screen(s) allows a HMI, or terminal, within visualization layer 1820 to render control data generated by a controller associated with a disparate HMI, or terminal that renders control data; therefore increasing resilience of control system 1800 against functional failure. In addition, peer-to-peer distribution of control screen(s), and other data resource(s) such as state information, dramatically simplifies deployment and integration capabilities of a control environment. Furthermore, peer-to-peer distribution of control screen(s) or data resource(s) can be regulated, optimized or satisfactorily implemented based in part on at least one of dynamics of resource updated, e.g., time dependence of state information, alarm conditions; criticality of controlled devices, machines, products and associated processes; available network resource(s), control environment(s), network integration specification(s) (e.g., control data is to be supplied to enterprise network devices), or the like. As an illustration, one or more clients in respective one or more HMIs within visualization layer 1820 can supply (e.g., generate, deliver, or generate and deliver) metadata that controls implementation of peer-to-peer exchange of data resource(s); e.g., the metadata can establish if peer-to-peer exchange amongst a cluster of nodes (e.g., HMIs or terminals that render control data) is to be terminated in view of rate of change of state information associated with control environment(s) linked to the cluster of nodes, or the metadata can identify resources that are allowed to delivered and received through peer-to-peer exchange. A component (not shown) within a HMI, or terminal that includes a client, can issue the foregoing metadata, wherein to issue metadata, the component (not shown) can generate the metadata and add the metadata to a data resource. Further yet, peer-to-peer distribution of control screens also enables automatic configuration of a visualization environment in an HMI or terminal employed to render control data within visualization layer 1820. In an aspect, automatic configuration of visualization environment(s) can be effected in response to an HMI, or terminal, being deployed (e.g., configured to operate) within visualization layer 1820. In another aspect, changes to configuration of a control screen in an HMI, or terminal, within visualization layer 1820, can result in automatic configuration of graphical environment(s) in at least one of disparate HMIs or terminals within visualization layer 1820. As described supra, in scenarios in which configuration of a control screen is updated, a client (e.g., $1826_1$) within visualization layer 1820 can supply a specific data resource (e.g., a data field, a data structure, a graphic object . . . ) associated with the update instead of supplying a complete updated control screen. The client can deliver (e.g., broadcast or multicast) an indication (an instruction, a data packet, a light-payload file (e.g., a cookie), an email communication, an instant message, etc.) that the control screen or a data resource thereof is updated and available for distribution; a disparate client (e.g., $1826_1$) in a disparate peer HMI (e.g., $1824_1$) can receive the indication, acknowledge it, and receive at least one of the updated control screen or the updated data resource thereof. As an example, a specific data field associated with a control screen update can be supplied to a peer client to update the control screen instead of delivering the full updated screen. Such update granularity avoids inefficient exchange of substantive volume of data in updated that entail a small volume of change; also, the updated granularity afforded by features of peer-to-peer exchange as described herein can reduce utilization of network resources (e.g., channels in broadband network) in access network(s) 1720, and thus improve overall performance of peer-to-peer exchange, e.g., resource availability, resource accessibility, and resource replication capability, within visualization layer 1820. Moreover, it should be appreciated that such update granularity is superior to conventional systems to update software components; such systems commonly deliver complete files regardless the magnitude of specific updates introduced in the software component.

Peer-to-peer exchange of data resource(s) also can include exchange of analyzed (e.g., aggregated) or otherwise processed (e.g., formatted) control data. A client (e.g., $1826_Q$) in a HMI (e.g., $1824_Q$) that enable the analysis or processing of the control data can communicate (e.g., broadcast or multicast) an indication that analyzed or processed control data is available for distribution; a disparate client (e.g., $1826_1$) in a disparate peer HMI (e.g., $1824_1$) can receive the indication, acknowledge it, and receive at least a portion of the analyzed control data available for distribution. In an illustrative scenario, if a data trend analysis is performed through tool(s) afforded through a HMI, or terminal, and rendered via the HMI, or terminal, such analysis and associated data can be distributed to at least one peer HMI. Such distribution of analyzed data does not originate in response to a network request, e.g., a peer HMI request analyzed data, and thus it provides increased network performance and control performance. For example, in the foregoing scenario, one or more operators that utilize the HMIs deployed in visualization layer 1820 are aware of operational trend(s) in a control environment.

Peer-to-peer exchange of data resource(s) as described herein is not domain specific: Data resource(s) available to a client (e.g., $1826_2$) associated with a controller in a first control environment (e.g., production area in manufacturing plant) can be distributed to a disparate client (e.g., $1826_Q$) associated with a disparate controller in a second control environment (e.g., packaging area in manufacturing plant). Such distribution of data resource(s) increases robustness of control system 1800 against operational failure. It should be appreciated that based on granularity of data resource(s), distinct control environments can have common data resource(s) that can be exchanged in peer-to-peer manner. Accordingly, such resources (e.g., a graphical object employed in a control screen) can be reused across the distinct control environment. Such reuse of data resource(s) can be implemented automatically or through human intervention. In one or more embodiments, an HMI or terminal that renders control data can multi-cast or broadcast, e.g., via a client component such as 1732, a request for a specific data resource (e.g., a graphical object or memory tag) and in response receive at least one of (i) an indication the specific data resource is available in one or more disparate clients or (ii) the specific data resource.

While each layer in example control system 1800 operates as a single logical unit for data exchange purposes, each layer can include one or more elements associated with disparate control environments and thus disparate portions of a single logical unit can operate under disparate requirement(s) or specification(s). Accordingly, in an aspect of the subject disclosure, peer-to-peer distribution or exchange of a data resource (e.g., a control screen or alarm condition) within a service layer or visualization layer can be based in part on a set of performance criteria. In an aspect of the subject disclosure, the set of performance criteria includes latency of access network(s) that enable exchange of the resource. Other performance criteria also can be employed such as access network(s) bandwidth, or criticality of a controlled process, as described supra. Performance criteria can be retained in at least one server within service layer 1810, at least one HMI, or terminal that renders control data, in visualization layer 1820, or one or more computing devices such as devices 1760. As an illustration, in one or more scenarios, high-latency network connectivity amongst two HMIs, e.g., HMI 1 $1824_1$ and HMI Q $1824_Q$, can prevent exchange of one or more resources in order to ensure control application(s) that generate control data rendered in at least one of the two HMIs are not prevented from proper execution: For instance, substantive communication intervals amongst the two HMIs can trigger an alarm, and ensuing termination of control cycle, in at least one of one or more controllers associated with at least one of the two HMIs. It should be appreciated that if access network latency is employed as a performance criteria that regulates peer-to-peer exchange of a resource, a performance metric associated with such performance criteria and that is relevant to resource exchange regulation is the ratio amongst network latency and time scale of control process. Thus, at various stages of a control process, an HMI (e.g., $1824_2$) can fluctuate between exchange-allowed and exchange-disallowed conditions based on value of the foregoing ratio.

Figure 19:
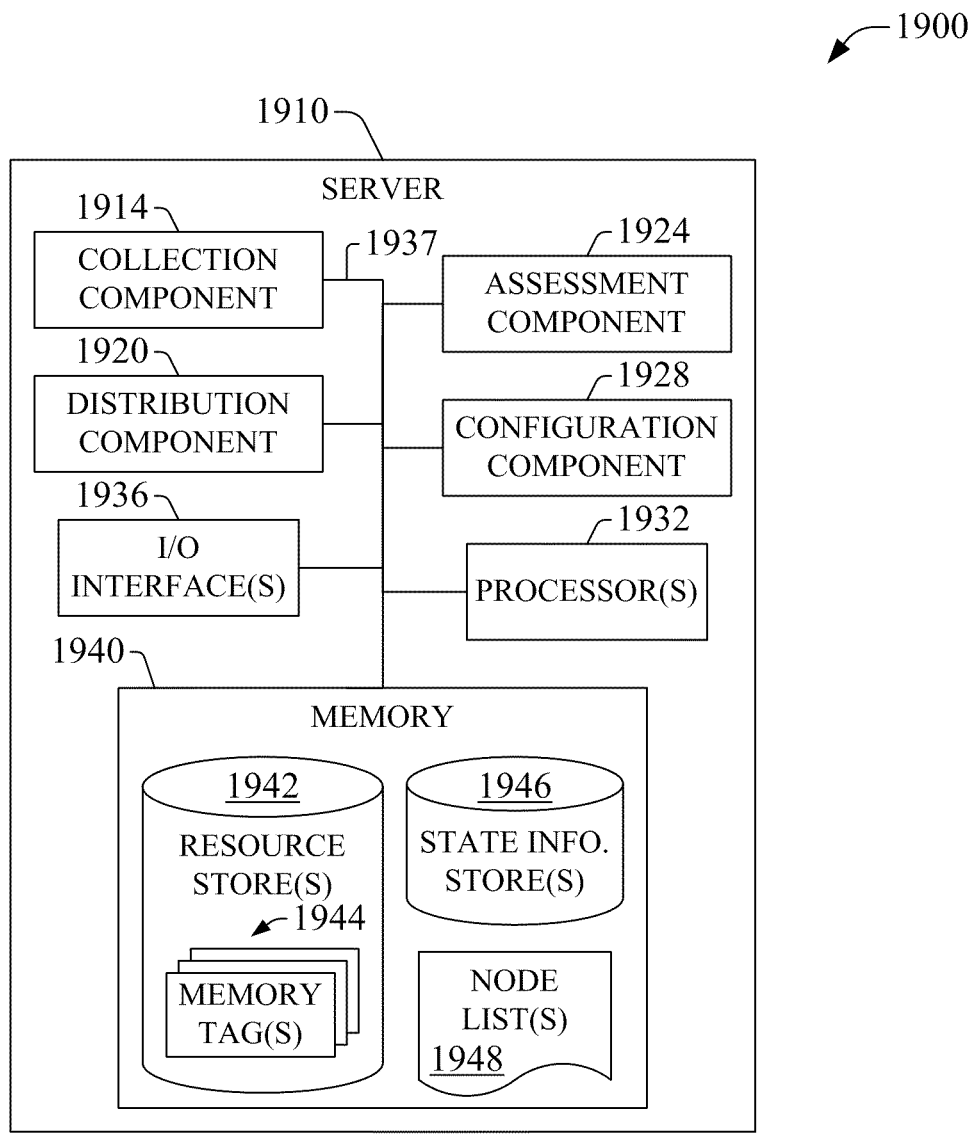
FIG. 19 is an example embodiment of a server that is part of one or more control systems in accordance with aspects of the subject disclosure.

In one or more embodiments of a server in service layer 1910, e.g., embodiment 1900 illustrated in FIG. 19, a server can include an assessment component 1924 that can generate list(s) that identifies a set of one or more clients that can exchange or distribute a resource within a predetermined response time. Assessment component 1924 also can produce list(s) of one or more servers that can exchange a resource within a specific response time interval. The resource, for example, can be a control screen and one or more graphical objects that compose the control screen. The list(s) can be retained in memory element 1948 within memory 1940. In the alternative or in addition, the list(s) or portion(s) thereof can be supplied to one or more HMIs, or terminals that render control data, within visualization layer 1820; respective client(s) in the one or more HMIs can receive the list(s), and at least one of the one or more HMIs can retain the list(s). In an aspect, list(s) or portion thereof can be provided to one or more HMIs in response to a request from at least one of the one or more HMIs. The at least one HMI that originates (e.g., generates and delivers) the request can exploit the requested list(s) or portion thereof to select at least one client for distribution of a data resource; a client within the at least one HMI can generate and deliver the request (e.g., an instruction, a data packet, a light-payload file (e.g., a cookie), an email communication, an instant message, a set of bits . . . ), and receive the requested list(s) or portion thereof. In one or more embodiments, to achieve its functionality, assessment component 1924 can include one or more of learning and reasoning component 1002, selection component 1006, and tracking component 1010.

In a scenario, list(s) can be generated by a plurality of two or more servers in the set of servers $1814_1$-$1814_R$. In such scenario, respective assessment components in the plurality of two or more servers produce the list(s) in parallel mode. To generate the foregoing list(s) of clients for exchange or distribution of a resource (e.g., a control screen, a graphical object . . . ), assessment component 1924 can select one or more clients in a visualization layer (e.g., 1820) and access (e.g., retrieve, receive) a metric that gauges demand of the resource in at least one of the one or more clients—in a scenario, the metric can determine demand of the resource in each of the one or more clients. Such metric can prioritize a group of clients, within the one or more clients, with respect to demand of the resource. Prioritization can improve performance of the extraction of a group of clients that can exchange the resource within a predetermined response time by removing from the selected one or more clients those clients with a low demand (e.g., below a configurable threshold) for the resource. It should be appreciated that generation of list(s) of servers for exchange or distribution of a resource can be accomplished in substantially the same or the same manner as implemented for clients. In an aspect, the predetermined response time can be a satisfactory time interval extracted from an objective function that determines response time in a set of clients within visualization layer. The satisfactory time interval can be below a configurable threshold; however, in one or more scenarios, the satisfactory time interval can be an optimal or substantially optimal time period. In one or more embodiments, a server (e.g., $1814_1$) can enable configuration of a satisfactory response time, or threshold thereof, for exchange or distribution of a data resource.

It should be appreciated that since downlink latency and uplink latency in a network can be asymmetric, assessment component 1924 can produce a first list for a first set of clients that can supply the resource and a second list for a second set of clients that can receive the resource. In addition, list of clients that can supply information, e.g., data resource(s), can be disparate from a list of clients that can receive information because clients that can supply information have the information available, whereas clients that receive the information need not have it available. It should further be appreciated that based on complexity (computing power, available computing time, monitored control environment, etc.) of a HMI or terminal, in visualization layer, the HMI, or terminal, can include an assessment component that operates in substantially the same manner as assessment component 1924, and select clients or servers suitable for exchange or distribution of at least one or more data resources. Selection of clients or servers can be conveyed through list(s), which can be retained in memory of at least one HMI, or terminal, or at least one server.

Figure 20:
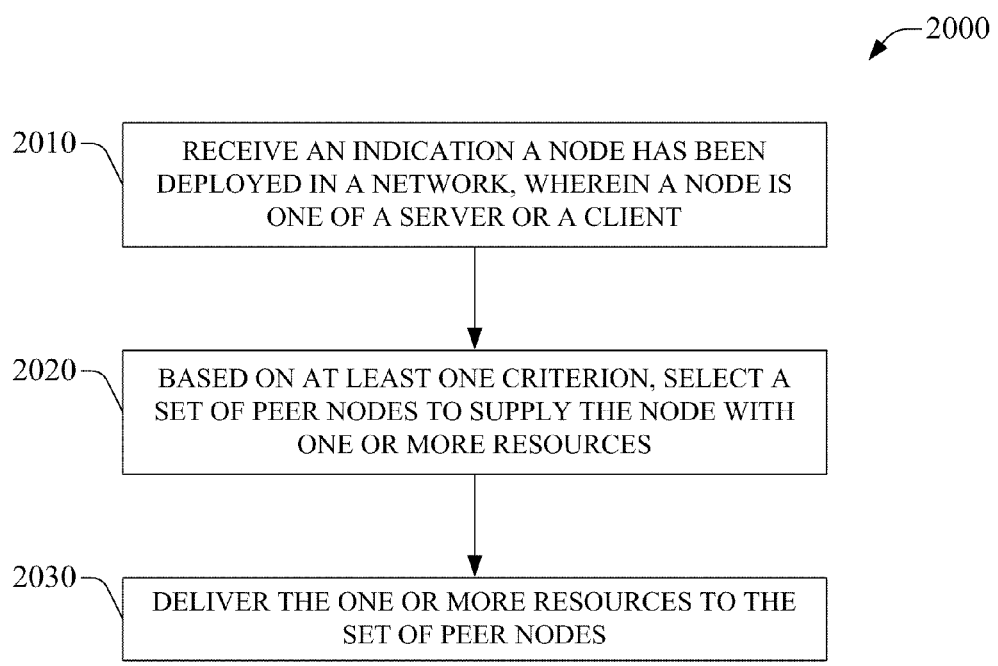
FIG. 20 is a flowchart of an example method for providing data in peer-to-peer mode in accordance with an aspect of the subject disclosure.

FIG. 20 is a flowchart of an example method for 2000 for providing data in peer-to-peer mode in accordance with an aspect of the subject disclosure. The subject example method can be implemented by one or more HMIs or terminals that render control data. In an aspect, one or more processors configured to provide or that provide the functionality of the one or more HMIs or terminals can implement the subject example method. In addition or in the alternative, one or more servers in a service layer can implement the subject example method; processor(s) configured to provide or that provide the functionality of the one or more servers can effect at least one of the acts of the subject example method. At act 2010, an indication a node has been deployed in a network is received, wherein the node is either a server or it includes a client component. At act 2020, based on at least one criterion, a set of peer nodes is selected to supply the node with one or more resources. If the node is a server, a peer node is a server. In the alternative, if the node includes a client, the peer node also includes a client, which can be a client deployed in a network element with the same or substantially the same functionality as the deployed node. As described supra, the at least one criterion can be an availability criterion. Moreover, a resource can include a file; a portion of a file; one or more data elements resident in a file; a control screen; a set of graphical objects that define, in part, a control screen; one or more data elements resident in memory; or the like. At act 2030, the one or more resources are delivered. At least one peer node in the set of peer nodes delivers the resources.

Figure 21:
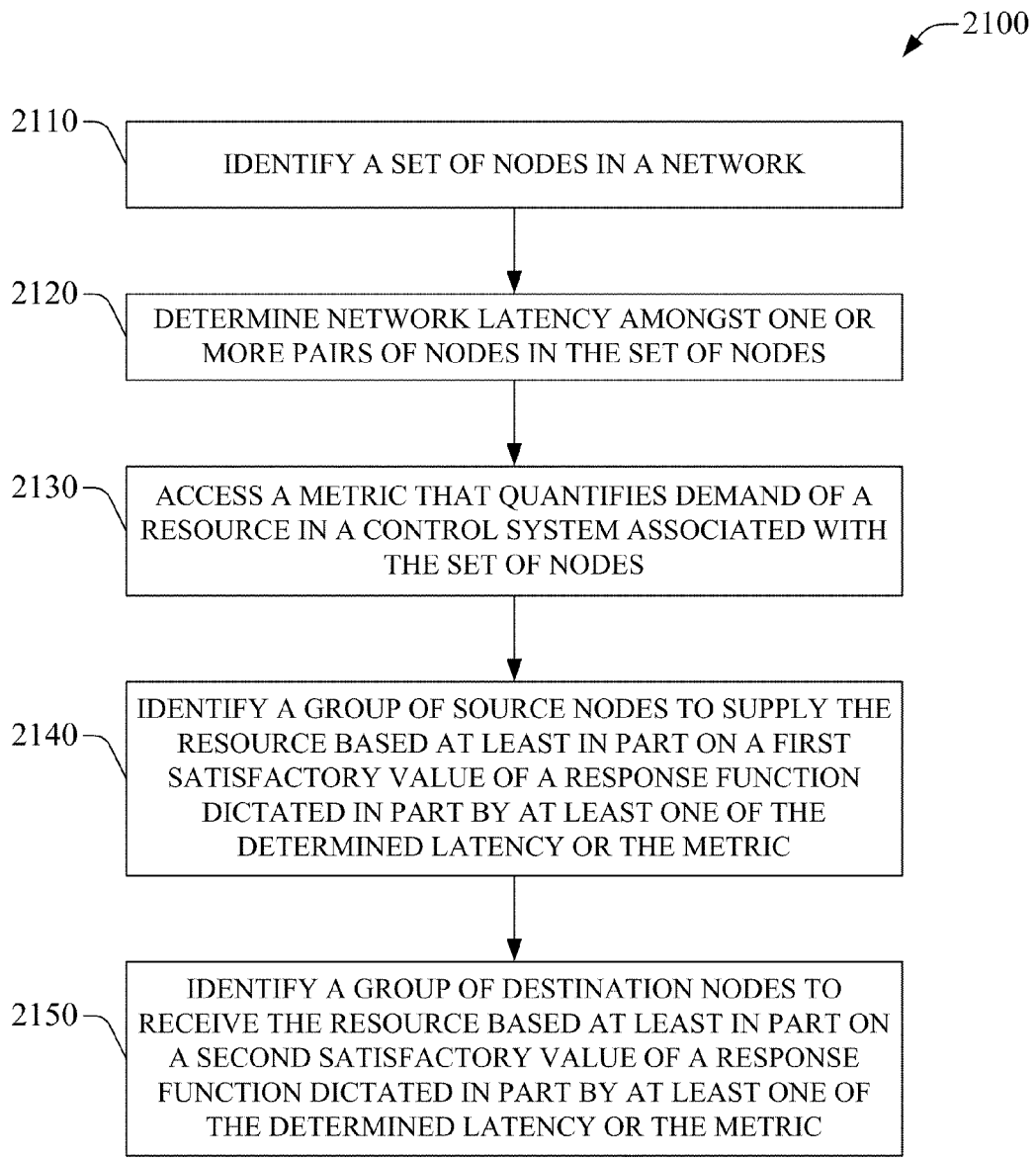
FIG. 21 is a flowchart of an example method to select a set of peer nodes based on at least one criterion in accordance with aspects of the subject disclosure.

FIG. 21 is a flowchart of an example method 2100 for selecting a set of peer nodes based on at least one criterion in accordance with aspects of the subject disclosure. While in the subject example method 2100 the criterion is network latency, other criteria that assesses network performance (e.g., bandwidth) can be employed to establish a set of peer nodes for exchange of one or more resources amongst nodes, which can be either servers or client-based nodes (e.g., visualization nodes). As an example, such criteria can be embodied in one or more metrics that assess network communication performance amongst pairs of nodes. The subject example method 2100 can be implemented by one or more one or more servers in a service layer can implement the subject example method; processor(s) configured to provide or that provide the functionality of the one or more servers can effect at least one of the acts of the subject example method. In one or more embodiments, based on complexity (computing power, available computing time, monitored control environment, etc.) of HMIs or terminals that render control data, the HMIs or terminals can effect the subject example method. In an aspect, one or more processors configured to provide or that provide the functionality of the one or more HMIs or terminals can implement the subject example method. At act 2110, a set of nodes in a network are identified. At act 2120, network latency amongst one or more pair of nodes in the set of nodes is determined. In one or more embodiments or scenarios, determining the network latency can be based on conventional mechanisms such as instructing a first node to deliver a control data packet to a second node and measure the data packet round-trip time. At act 2130, a metric that quantifies demand of a resource in a control system associated with the set of nodes is accessed. In an aspect, accessing such metric can include retrieving or otherwise receiving the metric from a server (e.g., server 2 $1814_2$), or a node, that is part of the network. In another aspect, accessing the metric can include extracting historical data on at least one of resource delivery, resource reception, or resource requests, and assigning a value to the metric based in part on the historical data. At act 2140, a group of source nodes is identified to supply the resource based at least in part on a first satisfactory value of a response function dictated in part by at least one of the determined latency or the metric. At act 2150, a group of destination nodes is identified to receive the resource based at least in part on a second satisfactory value of a response function dictated in part by at least one of the determined latency or the metric.

Figure 22:
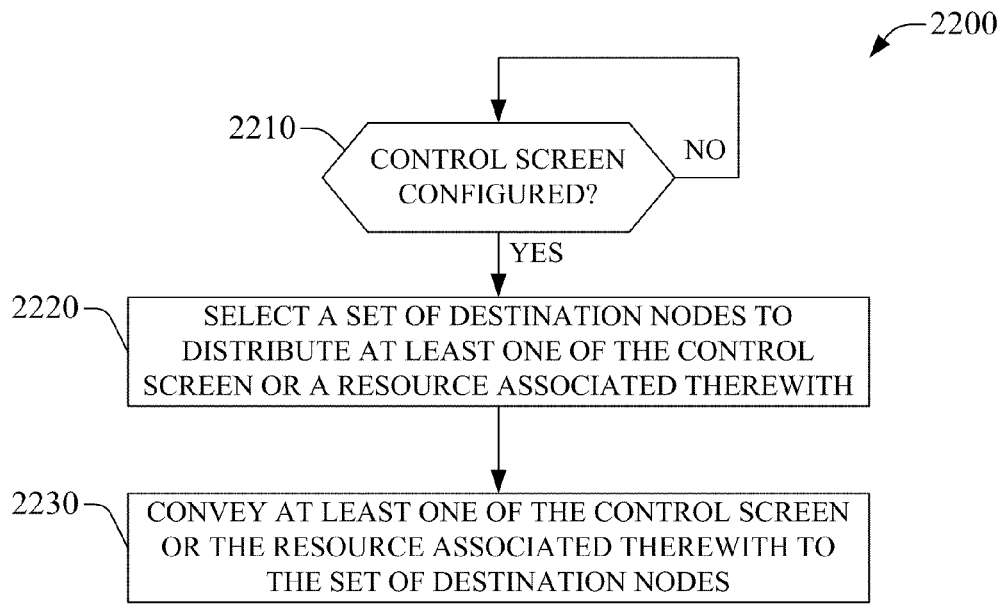
FIG. 22 is a flowchart of an example method for distributing a control screen in accordance with aspects described herein.

FIG. 22 is a flowchart of an example method 2200 for distributing a control screen in accordance with aspects described herein. The subject example method can be effected by one or more HMIs, or terminals, that render control data in a visualization layer. In an aspect, one or more processors configured to provide or that provide the functionality of the one or more HMIs or terminals can implement the subject example method. In addition or in the alternative, one or more servers in a service layer can implement the subject example method; processor(s) configured to provide or that provide the functionality of the one or more servers can effect at least one of the acts of the subject example method. At act 2210 it is determined if at least one of a control screen is configured. Configuration includes generation of the control screen, or update(s) to the control screen or resource(s) associated therewith in case the control is available, e.g., the control screen resides in a network node, such as an HMI (e.g., $1824_Q$). In addition to modification, an update to the resource(s) associated with the control screen can include addition or removal of the resource(s). In the negative case, if the control screen is not configured, act 2210 is re-enacted. Conversely, in the affirmative case, if the control screen is configured, flow continues to act 2220, in which a set of destination nodes is selected to distribute at least one of the control screen or resource(s) associated therewith. In one or more embodiments, selecting one or more nodes in the set of destination nodes can be based on example method 2100: In an aspect, the HMI, or other terminal that implements the subject example method, requests one or more servers in a service layer to identify a group of nodes suitable (e.g., that optimize a network performance function or metric) to receive the control screen, and in response to the request, the HMI, or other terminal the implements the subject example method, receives a list of destination nodes to which deliver the control screen or the resource(s) associated therewith. At act 2230, the at least one of the control screen or the resource(s) associated therewith is conveyed to the set of destination nodes.

Figure 23:
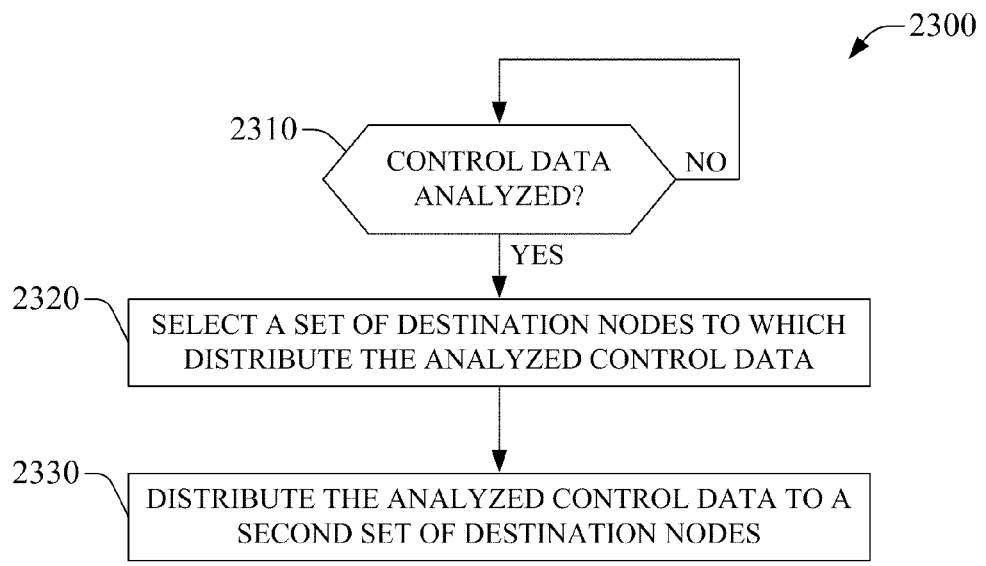
FIG. 23 is a flowchart of an example method for sharing control data in accordance with aspects described herein.

FIG. 23 is a flowchart of an example method 2300 for sharing control data in accordance with aspects described herein. The subject example method can be effected by one or more HMIs or terminals that render control data. In an aspect, one or more processors configured to provide or that provide the functionality of the one or more HMIs or terminals can implement the subject example method. In addition or in the alternative, one or more servers in a service layer can implement the subject example method; processor(s) configured to provide or that provide the functionality of the one or more servers can effect at least one of the acts of the subject example method. At act 2310 it is established if control data is analyzed. In an aspect, the control data can be rendered in accordance with one or more control screens associated with a control project resident in a controller (e.g., controller 1740). In the negative case, if the control data is not analyzed, act 2310 is re-enacted. Conversely, in the affirmative case, if the control data is analyzed, flow continues to At act 2320, a set of destination nodes to which distribute the analyzed control data is selected. One or more nodes in the set of nodes are peer nodes of the node (e.g., HMI node) in the network that renders and manipulates the control data. As discussed supra, in one or more embodiments, selecting one or more nodes in the set of destination nodes can be based on example method 2100: In an aspect, the HMI, or other terminal that implements the subject example method, requests one or more servers in a service layer to identify a group of nodes suitable (e.g., that optimize a network performance function or metric) to receive the control screen, and in response to the request, the HMI, or other terminal, that implements the subject example method, receives a list of destination nodes to which deliver the control data. At act 2330, the analyzed control data is transmitted to the set of nodes.

Method(s) disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute code instructions retained in a memory, or any computer- or machine-readable medium, to implement method(s) described herein; the code instructions, when executed by the one or more processor implement or carry out the various acts in the method(s) described herein. The code instructions provide a computer-executable or machine-executable framework to enact the method(s) described herein.

In the subject specification and annexed drawings, terms such as "store," "data store," data storage," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a first operator interface terminal configured to communicatively couple with an industrial controller and render control data in a memory location of the industrial controller on a graphical element of a graphical screen, wherein the first operator interface terminal is further configured to send a data resource to a second operator interface terminal using a peer-to-peer protocol, and wherein the data resource comprises at least one of the graphical screen or the graphical element and metadata that causes the control data in the memory location of the industrial controller to be rendered on the second operator interface terminal via the graphical element.

2. The system of claim 1, wherein the first operator interface terminal is further configured to deliver the data resource to the second operator interface terminal in response to detection of an update of the at least one of the graphical screen or the graphical element implemented at the first operator interface terminal.

3. The system of claim 2, wherein the update comprises generation of the graphical screen or a modification to the graphical screen.

4. The system of claim 2, wherein the first operator interface terminal is further configured to send a request to a data management system for identification of one or more destination operator interface terminals that are to receive the data resource in response to the detection of the update, and receive identification data from the data management system identifying the one or more destination operator interface terminals.

5. The system of claim 1, wherein the first operator interface terminal is further configured to receive an instruction from a server to provide the data resource to the second operator interface terminal based on at least one network performance criterion.

6. The system of claim 5, wherein the first operator interface terminal is selected by the server based on a relative estimated response time for delivery of the data resource.

7. The system of claim 1, wherein the first operator interface terminal is further configured to communicatively couple to at least one of the industrial controller or the second operator interface terminal through at least one access network.

8. The system of claim 7, further comprising an interface configured to communicatively couple a set of external networks with the first operator interface terminal.

9. The system of claim 1, wherein the graphical screen is a first graphical screen, and the first operator interface terminal is further configured to receive an instruction from a data management station to store a second graphical screen determined to be accessed at a frequency above a threshold frequency for delivery to other operator interface terminals in response to a determination that the first operator interface terminal allows faster retrieval than the second operator interface terminal.

10. The system of claim 1, wherein the graphical screen is a first graphical screen, and the first operator interface terminal is further configured to receive an instruction from a data management station to store a second graphical screen that is also stored on the second operator interface terminal for delivery to other operator interface terminals in response to a determination that the second graphical screen is accessed at a frequency that exceeds a threshold frequency.

11. The system of claim 1, wherein:
the graphical screen is a first graphical screen, the graphical element is a first graphical element, and the data resource is a first data resource,
the first operator interface terminal is further configured to receive a second data resource from one or more other operator interface terminals using the peer-to-peer protocol, and
the second data resource is at least one of a second graphical screen or a second graphical element of the second graphical screen.

12. The system of claim 11, wherein the one or more other operator interface terminals comprise multiple operator interface terminals, and the operator interface is further configured to receive the second data resource from the multiple operator interface terminals over respective multiple peer-to-peer data paths.

13. The system of claim 1, wherein the first operator interface terminal is further configured to deliver the data resource to the second operator interface terminal in response to detecting that the second operator interface terminal has been added to a set of peer-to-peer nodes including the first operator interface terminal.

14. The system of claim 1, wherein the first operator interface terminal is further configured to deliver a subset of the control data to the second operator interface terminal using the peer-to-peer protocol.

15. A method, comprising:
receiving, by a system including a processor, an indication that an operator interface terminal has been deployed in a network;
based on at least one criterion, selecting a set of peer operator interface terminals to supply the operator interface terminal with a data resource, wherein the data resource is at least one of a graphical interface screen or a graphical element of the graphical interface screen and includes metadata that identifies at least one memory address of an industrial controller containing control data to be rendered via at least one of the graphical interface screen or the graphical element; and
delivering the data resource to the operator interface terminal from the set of peer operator interface terminals using a peer-to-peer data transfer, wherein the metadata causes the control data contained in the memory address to be rendered on the operator interface via at least one of the graphical interface screen or the graphical element.

16. The method of claim 15, further comprising:
in response to detecting an update to the graphical interface screen at the first operator interface terminal or at one of the set of peer operator interface terminals, selecting a set of destination operator interface terminals to which to distribute at least one of the graphical interface screen or the graphical element including the update; and
conveying at least one of the graphical interface screen or the graphical element including the update to the set of destination operator interface terminals, wherein the set of destination operator interface terminals are selected from the first operator interface terminal and the set of peer operator interface terminals.

17. The method of claim 16, wherein the selecting the set of destination operator interface terminals comprises:

requesting identification of a group of operator interface terminals, including the set of destination operator interface terminals, suitable to receive the graphical interface screen; and
in response to the requesting, receiving identification of the destination operator interface terminal to deliver the graphical interface screen.

18. The method of claim 15, further comprising:
receiving, at the operator interface terminal, control data from an industrial controller for visualization on the graphical interface screen;
selecting, from the set of peer operator interface terminals, a set of destination operator interface terminals to which to distribute the control data; and
distributing the control data to the set of destination operator interface terminals using the peer-to-peer data transfer.

19. The method of claim 15, wherein the selecting comprises:
determining a network latency amongst one or more pairs of operator interface terminals of a set of operator interface terminals, wherein the set of operator interface terminals comprises the operator interface terminal and the set of peer operator interface terminals;
accessing a metric that quantifies demand of a resource in a control system associated with the set of operator interface terminals; and
identifying a group of source operator interface terminals, of the set of operator interface terminals, to supply the resource based at least on a value of a response function that is based at least in part on at least one of the network latency or the metric.

20. The method of claim 19, wherein the accessing comprises retrieving or receiving the metric from at least one of the set of operator terminals.

21. The method of claim 19, wherein the accessing comprises:
extracting historical data relating to at least one of delivery of the resource, reception of the resource, or requests for the resource; and
assigning a value to the metric based at least in part on the historical data.

22. The method of claim 15, further comprising:
selecting one or more data resources for peer-to-peer backup on multiple operator interface terminals, of the set of peer operator interface terminals, based on at least one data criterion, wherein the data criterion includes a frequency at which the one or more data resources are accessed;
determining an availability of the multiple operator interface terminals based on at least one availability criterion;
selecting a subset of the multiple operator interface terminals on which to store the one or more data resources; and
storing the one or more data resources on the subset of the multiple operator interface terminals.

23. The method of claim 22, further comprising:
prioritizing multiple data resources based on an importance ranking; and
backing up a data resource ranked highest in the importance ranking on the subset of the multiple operator interface terminals.

24. The method of claim 22, further comprising:
in response to detection of a failed operator interface terminal of the set of peer operator interface terminals, requesting a copy of the one or more data resources during a restore process for the failed operator interface terminal;

determining an availability of a subset of the peer operator interface terminals during the restore process;

retrieving the copy of the one or more data resources from the subset of the peer operator interface terminals in response to determining that the subset of the peer operator interface terminals are available; and operating the failed operator interface terminal using the copy of the one or more data resources.

25. A device, comprising:

a display component configured to render control data associated with a memory tag of an industrial controller via a graphical element of a graphical interface screen; and at least one processor configured to execute computer-executable instructions retained in a memory to implement a client component configured to exchange a data resource with one or more peer devices in a network, wherein the data resource comprises at least one of the graphical screen or the graphical element and data that identifies the memory tag of the industrial controller, wherein the data causes the control data to be rendered on the one or more peer devices via the graphical element.

26. The device of claim 25, wherein the client component is further configured to deliver or receive the data resource in response to an update to the at least one of the graphical screen or the graphical element.

27. The device of claim 26, wherein the client component is further configured to deliver or receive the data resource in response to detection of an addition of the one or more peer devices to the network.

28. The device of claim 26, wherein the client component is further configured to supply metadata that controls peer-to-peer exchange of the data resource.

29. The device of claim 26, wherein the at least one processor is further configured to execute the computer-executable instructions retained in the memory to implement an assessment component configured to select the one or more peer devices based in part on a network performance criterion.

* * * * *